United States Patent
Hikosaka

(10) Patent No.: US 10,833,523 B2
(45) Date of Patent: Nov. 10, 2020

(54) ELECTRICITY STORAGE ELEMENT CHARGING METHOD AND ELECTRICITY STORAGE DEVICE

(71) Applicant: KAGRA INC., Osaka (JP)

(72) Inventor: Akihiro Hikosaka, Osaka (JP)

(73) Assignee: KAGRA INC. (JP)

( * ) Notice: Subject to any disclaimer, the term of this patent is extended or adjusted under 35 U.S.C. 154(b) by 0 days.

(21) Appl. No.: 15/313,409

(22) PCT Filed: Jun. 10, 2014

(86) PCT No.: PCT/JP2014/065306
§ 371 (c)(1),
(2) Date: Nov. 22, 2016

(87) PCT Pub. No.: WO2015/189907
PCT Pub. Date: Dec. 17, 2015

(65) Prior Publication Data
US 2017/0201102 A1    Jul. 13, 2017

(51) Int. Cl.
*H02J 7/02* (2016.01)
*H02J 7/00* (2006.01)
(Continued)

(52) U.S. Cl.
CPC .............. *H02J 7/02* (2013.01); *H02J 7/0013* (2013.01); *H02J 7/0019* (2013.01);
(Continued)

(58) Field of Classification Search
CPC ....... H02J 7/0021; H02J 7/0016; H02J 7/0013
(Continued)

(56) References Cited

U.S. PATENT DOCUMENTS 3,909,685 A  *  9/1975  Baker ................ H02M 7/49
                                                    318/139
5,710,504 A  *  1/1998  Pascual ............... H02J 7/0018
                                                    180/65.8
(Continued)

FOREIGN PATENT DOCUMENTS

EP    1 947 752 A1    7/2008
EP    2 600 486 A1    6/2013
(Continued)

OTHER PUBLICATIONS

Grant of Patent for the corresponding Korean Patent Application No. 10-2016-7028216 dated Dec. 6, 2016.
(Continued)

*Primary Examiner* — David V Henze-Gongola
*Assistant Examiner* — Tarikh Kanem Rankine
(74) *Attorney, Agent, or Firm* — Ostrolenk Faber LLP

(57) ABSTRACT

A two-terminal circuit having a relatively high series degree is configured by connecting a plurality of electricity storage elements to each other, and charging of the electricity storage elements is started by injecting a current into this two-terminal circuit. After the connection of the electricity storage elements is changed to reduce the series degree and a voltage variation among the electricity storage elements is solved at a predetermined timing, a connection change is made to configure a two-terminal circuit having a high series degree again and charging is continued. Each electricity storage element can be charged in a short time while voltages are balanced among the electricity storage elements.

10 Claims, 10 Drawing Sheets

(51) Int. Cl.
*H01M 10/0525* (2010.01)
*H01M 10/44* (2006.01)

(52) U.S. Cl.
CPC ....... *H02J 7/0024* (2013.01); *H01M 10/0525* (2013.01); *H01M 10/441* (2013.01)

(58) Field of Classification Search
USPC ........................................................ 320/117
See application file for complete search history.

(56) References Cited

U.S. PATENT DOCUMENTS

| | | | | | |
|---|---|---|---|---|---|
| 5,712,553 | A * | 1/1998 | Hallberg | ............. | H01M 10/441 307/75 |
| 5,898,295 | A * | 4/1999 | Patino | .................. | H01M 10/44 320/148 |
| 5,932,932 | A * | 8/1999 | Agatsuma | ................ | B60K 6/48 307/10.6 |
| 6,140,799 | A * | 10/2000 | Thomasson | ......... | H01M 10/441 320/117 |
| 6,241,751 | B1 * | 6/2001 | Morgan | .................. | A61N 1/39 607/8 |
| 6,323,623 | B1 | 11/2001 | Someya et al. | ............... | 320/166 |
| 6,430,692 | B1 * | 8/2002 | Kimble | .................. | G06F 1/263 307/66 |
| 7,456,610 | B2 * | 11/2008 | Yamashita | ............ | H02J 7/0016 320/116 |
| 7,692,404 | B2 * | 4/2010 | Harris | ....................... | B60L 7/14 320/117 |
| 7,782,013 | B2 * | 8/2010 | Chang | ................ | H01M 10/441 320/116 |
| 7,907,430 | B2 * | 3/2011 | Kularatna | ................. | G05F 1/46 320/167 |
| 7,962,212 | B2 * | 6/2011 | Signoff | .................. | A61N 1/378 320/121 |
| 8,502,502 | B2 * | 8/2013 | Huang | .................. | H01M 2/204 320/116 |
| 2004/0124810 | A1 * | 7/2004 | Smallwood | ........... | H02J 7/0077 320/128 |
| 2005/0052154 | A1 * | 3/2005 | Kavounas | ............. | H02J 7/0024 320/116 |
| 2007/0257642 | A1 * | 11/2007 | Xiao | ..................... | H02J 7/0026 320/134 |
| 2008/0180061 | A1 * | 7/2008 | Koski | ................. | H01M 10/441 320/117 |
| 2009/0036943 | A1 * | 2/2009 | Signoff | .................. | A61N 1/378 607/36 |
| 2009/0085553 | A1 * | 4/2009 | Kumar | ................ | H01M 10/425 323/351 |
| 2009/0134851 | A1 * | 5/2009 | Takeda | .................... | H02M 3/07 323/234 |
| 2010/0261048 | A1 * | 10/2010 | Kim | ....................... | H01M 10/44 429/150 |
| 2011/0001442 | A1 * | 1/2011 | Lee | ........................... | B62M 6/45 318/139 |
| 2011/0001456 | A1 * | 1/2011 | Wang | .................... | H02J 7/0016 320/117 |
| 2011/0215760 | A1 * | 9/2011 | van Lammeren | ..... | H02J 7/0014 320/116 |
| 2012/0091964 | A1 * | 4/2012 | Vance | .................... | B60L 3/0046 320/122 |
| 2012/0119582 | A1 * | 5/2012 | Tajima | ................... | H02J 7/0024 307/71 |
| 2012/0274140 | A1 * | 11/2012 | Ganor | .................... | H02J 7/0011 307/71 |
| 2013/0200860 | A1 | 8/2013 | Takeda et al. | ................. | 320/167 |
| 2013/0300370 | A1 * | 11/2013 | Hotta | .................. | H01M 10/425 320/117 |
| 2013/0320772 | A1 * | 12/2013 | Qiao | ..................... | H01M 10/04 307/87 |
| 2014/0015488 | A1 * | 1/2014 | Despesse | ............ | H01M 10/425 320/122 |
| 2014/0043010 | A1 * | 2/2014 | Salem | ................. | H02M 3/1584 323/311 |
| 2014/0101462 | A1 * | 4/2014 | Rose | ........................ | G06F 1/263 713/300 |
| 2015/0048796 | A1 * | 2/2015 | Sherstyuk | ........... | H01M 10/425 320/129 |

FOREIGN PATENT DOCUMENTS

| | | |
|---|---|---|
| FR | 2947112 A1 | 12/2010 |
| JP | H11-299112 A | 10/1999 |
| JP | 2000-324710 | 11/2000 |
| JP | 2005-341661 | 12/2005 |
| JP | 2006-158073 | 6/2006 |
| JP | 2011-109875 | 6/2011 |
| JP | 2013-081316 | 5/2013 |
| WO | WO 2007/046138 A1 | 4/2007 |
| WO | WO 2011/132302 A1 | 10/2011 |
| WO | WO 2012/014281 A1 | 2/2012 |

OTHER PUBLICATIONS

International Search Report dated Aug. 5, 2014 in corresponding PCT International Application No. PCT/JP2014/065306.
Written Opinion dated Aug. 5, 2014 in corresponding PCT International Application No. PCT/JP2014/0653016.
Extended European Search Report dated Mar. 13, 2017 issued in corresponding European Patent Application No. 14894338.4.

* cited by examiner

F I G. 8
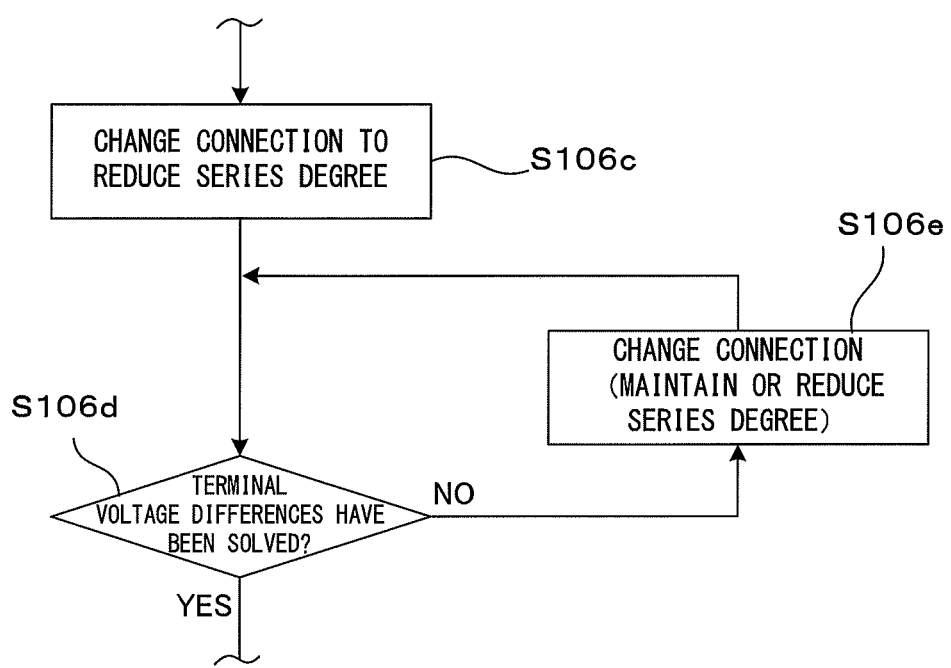

ELECTRICITY STORAGE ELEMENT CHARGING METHOD AND ELECTRICITY STORAGE DEVICE

CROSS-REFERENCE TO RELATED APPLICATIONS

The present application is a 35 U.S.C. §§ 371 national phase conversion of PCT/JP2014/065306, filed Jun. 10, 2014, the content of which is incorporated herein by reference. The PCT International Application was published in the Japanese language.

TECHNICAL FIELD

This invention relates to a method for charging a plurality of electricity storage elements and an electricity storage device with a plurality of electricity storage elements.

BACKGROUND

Some of techniques for storing energy utilize electricity storage elements such as capacitors utilizing the adsorption and desorption of physical electric charges (ion molecules) and secondary batteries for converting electrical energy into chemical energy and storing it. In these techniques, since an electricity storage capacity of a single electricity storage element and a usable range of terminal voltages are limited, a multitude of electricity storage elements are generally used in an electrical connection state. In the case of charging a plurality of electricity storage elements, it is desired to fully charge all the electricity storage elements in as short a time as possible while suppressing a variation of terminal voltages among the respective electricity storage elements. To this end, there has been proposed a technique for charging a plurality of electricity storage elements while changing a connection state of the electricity storage elements by turns.

For example, in a technique described in patent literature 1, an electricity storage is provided which has such a circuit configuration that a plurality of circuit blocks each including a plurality of capacitors switchable between series connection and parallel connection are connected in series. Charging is started with the capacitors included in each circuit block connected in series and when a total of terminal voltages of the capacitors in the circuit block reaches a predetermined value, the connection of the capacitors in this circuit block is changed to parallel connection. By connecting the capacitors in parallel, an unbalance of the terminal voltages is corrected. Further, for example, in a technique described in patent literature 2, charging is performed while the connection of adjacent ones of capacitors connected to each other in series is successively changed from series connection to parallel connection.

CITATION LIST

Patent Literature

Patent Literature 1 WO2007/046138
Patent Literature 2 WO2012/014281

SUMMARY OF INVENTION

Technical Problem

In the above conventional techniques, importance is given to the suppression of voltages at both ends of a two-terminal circuit formed by electrically connecting a plurality of electricity storage elements (capacitors) below an input resistance voltage of a load device to be connected. Thus, as charging proceeds, the number of the electricity storage elements connected in parallel gradually increases. Since electric charges injected from outside are distributed among the electricity storage elements connected in parallel, a required time until full charging is reached becomes longer as compared to series connection. As just described, the above conventional techniques have room for improvement in shortening a charging time.

This invention was developed in view of the above problem and aims to provide a technique capable of charging electricity storage elements in a short time while balancing voltages among the electricity storage elements in a charging method using a plurality of electricity storage elements and an electricity storage device.

Solution to Problem

One aspect of the invention is directed to a charging method for charging three or more electricity storage elements by connecting the electricity storage elements electrically, when a series degree of a two-terminal circuit is defined as a number of unit circuits connected in series for a two-terminal circuit having a circuit configuration in which a plurality of unit circuits are connected in series, each of the unit circuits being composed of a single electricity storage element or a plurality of the electricity storage elements connected in parallel or as 1 for a two-terminal circuit in which all of the electricity storage elements are connected in parallel (i.e. a single unit circuit is configured by all the electricity storage elements), the charging method comprising a first step in which the electricity storage elements are connected to configure a two-terminal circuit having a value of the series degree of 2 or larger and each of the electricity storage elements are charged by injecting a current into the two-terminal circuit, a second step in which a new two-terminal circuit is configured by changing a connection of the electricity storage elements to reduce the value of the series degree and a third step in which a new two-terminal circuit is configured by changing the connection of the electricity storage elements to increase the value of the series degree and charging each of the electricity storage elements by injecting a current into the two-terminal circuit.

Further, another aspect of the invention is directed to an electricity storage device, comprising three or more electricity storage elements, a connector which configures a two-terminal circuit by electrically connecting the electricity storage elements and a current injector which charges the electricity storage elements by injecting a current into the two-terminal circuit configured by the connector, wherein when a series degree of a two-terminal circuit is defined as a number of unit circuits connected in series for a two-terminal circuit having a circuit configuration in which a plurality of unit circuits are connected in series, each of the unit circuits being composed of a single electricity storage element or a plurality of the electricity storage elements connected in parallel or as 1 for a two-terminal circuit in which all of the electricity storage elements are connected in parallel, the connector forms a first two-terminal circuit having a value of the series degree of 2 or larger, a second two-terminal circuit having a smaller value of the series degree than the first two-terminal circuit and a third two-terminal circuit having a value of the series degree larger than the second two-terminal circuit in this order by switching a connection state of the electricity storage elements.

In the invention thus configured, the current is injected into the two-terminal circuit configured by electrically connecting the plurality of electricity storage elements to perform charging. The two-terminal circuit in this invention has either a circuit configuration in which the plurality of unit circuits are connected in series or a circuit configuration in which all the electricity storage elements are connected in parallel. Further, each of the plurality of unit circuits includes either a single electricity storage element or a plurality of electricity storage elements connected to each other in parallel.

Note that, in the invention, the "unit circuit" is a concept indicating a circuit not fixedly provided, but temporarily appearing when the two-terminal circuit is configured by connecting the electricity storage elements and including a single or a plurality of electricity storage elements. When the two-terminal circuit can be regarded as a series circuit of a plurality of unit circuits, the number of the unit circuits constituting this series circuit is called the "series degree". Further, the series degree of the two-terminal circuit in which all the electricity storage elements are connected in parallel is 1.

In the invention, after the charging of each electricity storage element is started by injecting the current into the two-terminal circuit having a relatively high series degree, the connection of the two-terminal circuit is changed to reduce the series degree, i.e. reduce the value of the series degree. To reduce the series degree of the two-terminal circuit means that at least one electricity storage element in the two-terminal circuit is newly connected to another electricity storage element in parallel. By connecting a plurality of electricity storage elements in parallel, terminal voltages are made uniform among those electricity storage elements. In this way, a voltage variation among the electricity storage elements is suppressed.

On the other hand, a long time is required for charging each electricity storage element with the electricity storage elements connected in parallel. Thus, in the invention, the connection of the electricity storage elements is changed again to configure a two-terminal circuit having a higher series degree, i.e. a larger value of the series degree. In this way, the time required for charging each electricity storage element is shortened.

As just described, in the invention, after a voltage variation among the electricity storage elements is corrected by changing the connection to temporarily reduce the series degree of the two-terminal circuit configured by the plurality of electricity storage elements, the two-terminal circuit having a high series degree is configured again in the process of charging. By doing so, each electricity storage element can be charged in a short time while voltages are balanced among the electricity storage elements.

Advantageous Effects of Invention

According to the invention, after charging is started in a state where the series degree of the two-terminal circuit configured by the plurality of electricity storage elements is relatively high and the connection is changed to temporarily configure the two-terminal circuit having a low series degree, the two-terminal circuit having a high series degree is configured again. In this way, each electricity storage element can be charged in a short time while voltages are balanced among the electricity storage elements.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF DRAWINGS

FIG. 8 is a flow chart showing a part of a modification of the charging operation of FIG. 6.

DETAILED DESCRIPTION OF THE PREFERRED EMBODIMENTS

Figure 1A:
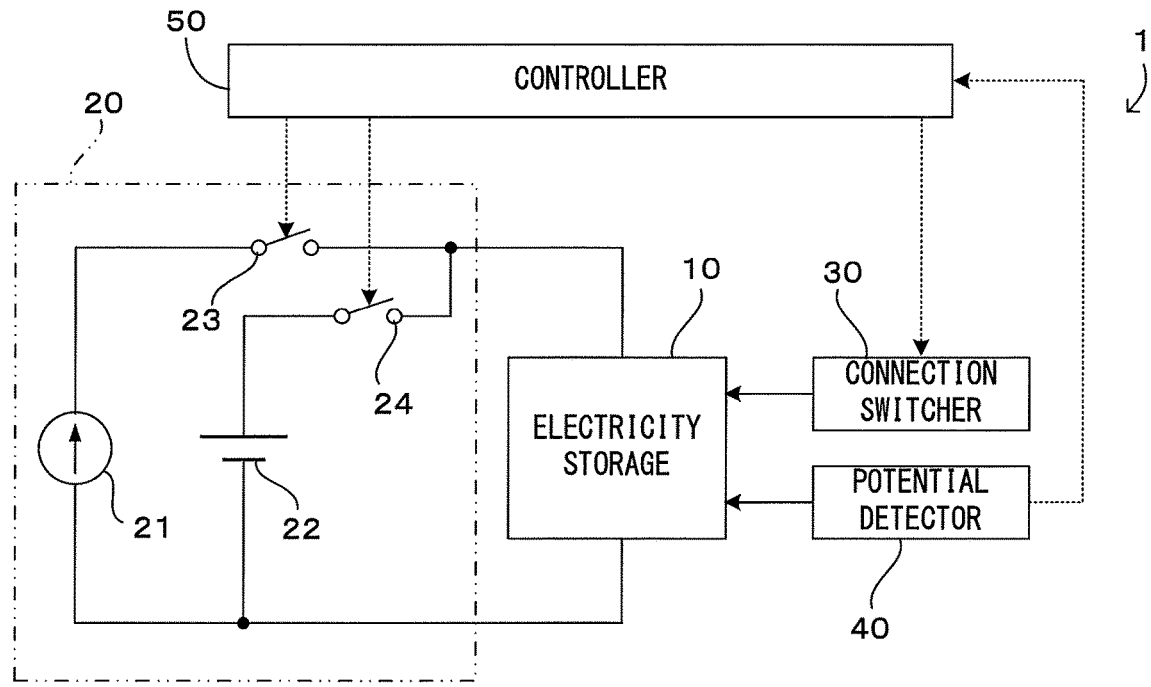
FIGS. 1A and 1B are diagrams showing one embodiment of an electricity storage device according to the invention.
Figure 1B:
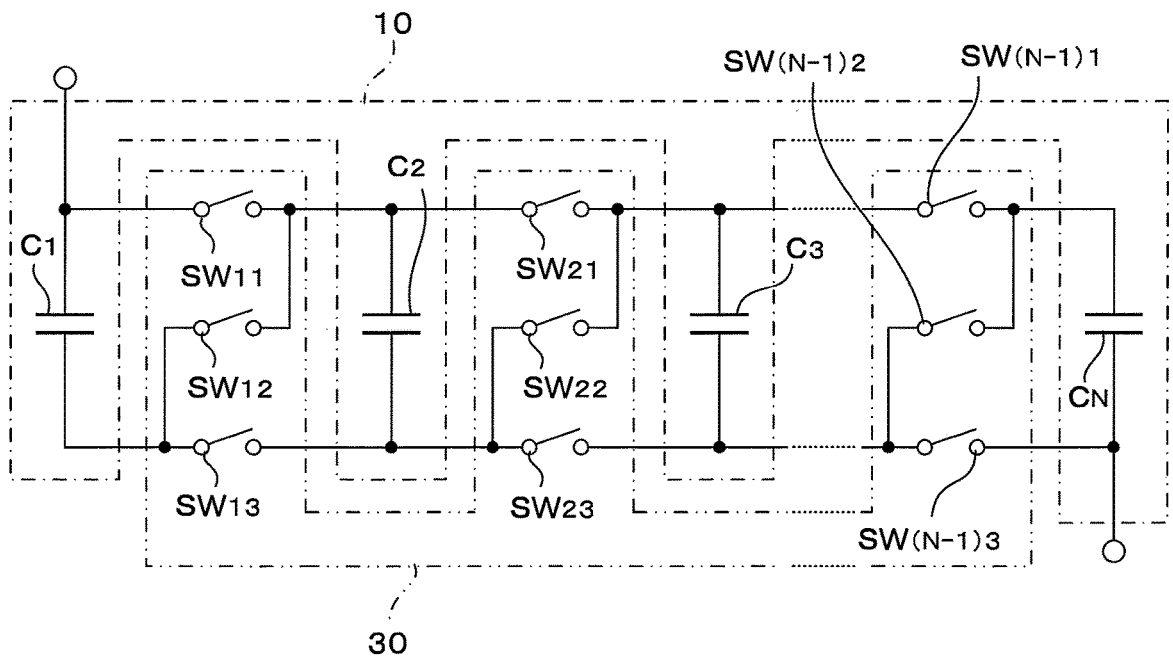

FIGS. 1A and 1B are diagrams showing one embodiment of an electricity storage device according to the invention. More specifically, FIG. 1A is a block diagram showing the electricity storage device 1 to which an electricity storage element charging method according to the invention is suitably applied. Further, FIG. 1B is a circuit diagram showing electrical configurations of an electricity storage 10 and a connection switcher 30 provided in the electricity storage device 1.

The electricity storage device 1 includes the electricity storage 10, a power feeder 20, the connection switcher 30, a potential detector 40 and a controller 50. The electricity storage 10 includes a plurality of electricity storage elements each having a function of storing electrical energy. The power feeder 20 feeds power to the electricity storage 10. The connection switcher 30 has a function of electrically connecting the plurality of electricity storage elements provided in the electricity storage 10 by a switch group to be described later and can realize a plurality of types of circuit configurations by changing a connection state of the electricity storage elements.

The potential detector 40 has a function of individually detecting potentials at both terminals of each electricity storage element provided in the electricity storage 10. Further, the controller 50 has a function of comprehensively controlling each component described above to cause the electricity storage device 1 to perform a predetermined charging operation.

The power feeder 20 includes a current source 21 for outputting a predetermined direct current, a voltage source 22 for outputting a predetermined dc voltage and switches 23, 24 for selectively connecting these to the electricity storage 10. Specifically, the current source 21 and the electricity storage 10 are connected via the switch 23, whereas the voltage source 22 and the electricity storage 10 are connected via the switch 24. The switches 23, 24 are controlled to be opened and closed by the controller 50. A constant current output from the current source 21 is supplied to the electricity storage element 10 when the switch 23 is closed. On the other hand, a constant voltage output from the voltage source 22 is supplied to the electricity storage element 10 when the switch 24 is closed.

The electricity storage 10 includes N (N is a natural number not smaller than 3) electricity storage elements $C_1$, $C_2$, $C_3$, ..., $C_N$. Electrochemical capacitors such as electric double layer capacitors, hybrid capacitors and redox capacitors and secondary batteries such as lithium-based secondary batteries, nickel-hydrogen batteries, sodium-sulfur batteries, zinc-halogen batteries and redox flow batteries can be, for example, suitably applied as these electricity storage elements.

These electricity storage elements $C_1$, $C_2$, $C_3$, ..., $C_N$ are connected via the switch group provided in the connection switcher 30. Specifically, two electricity storage elements $C_n$, $C_{n+1}$ (n is a natural number not smaller than 1 and smaller than N) adjacent in the circuit diagram are electrically connected via three switches $SW_{n1}$, $SW_{n2}$ and $SW_{n3}$. More specifically, one (upper one in FIG. 1B) terminal of the electricity storage element $C_n$ and one terminal of the electricity storage element $C_{n+1}$ are connected via the switch $SW_{n1}$, and the other (lower one in FIG. 1B) terminal of the electricity storage element $C_n$ and the other terminal of the electricity storage element $C_{n+1}$ are connected via the switch $SW_{n3}$. Further, the other terminal of the electricity storage element $C_n$ and the one terminal of the electricity storage element $C_{n+1}$ are connected via the switch $SW_{n2}$. The switches $SW_{n1}$, $SW_{n2}$ and $SW_{n3}$ are controlled to be opened and closed by the controller 50.

An arbitrary opening/closing structure can be used for these switches. Since there is a possibility that a large current transiently flows when the switches are opened and closed, it is preferable to use, for example, semiconductor switches having no mechanical contact in order to avoid the generation of spark.

For example, between the leftmost electricity storage element $C_1$ and the electricity storage element $C_2$ adjacent thereto in the circuit diagram, the switch $SW_{11}$ is provided between one terminal of the electricity storage element $C_1$ and one terminal of the electricity storage element $C_2$. The switch $SW_{12}$ is provided between the other terminal of the electricity storage element $C_1$ and the other terminal of the electricity storage element $C_2$. Further, the switch $SW_{13}$ is provided between the other terminal of the electricity storage element $C_1$ and the one terminal of the electricity storage element $C_2$.

The potential of each of the one and other terminals of the electricity storage element $C_n$ is individually detected by the potential detector 40 and a difference between these potentials represents a terminal voltage of the electricity storage element $C_n$. A potential detection result by the potential detector 40 is given to the controller 50. The controller 50 obtains the terminal voltage of each electricity storage element $C_n$ based on the potential detection result given from the potential detector 40 and controls each component of the device based on that result.

Figure 2A:
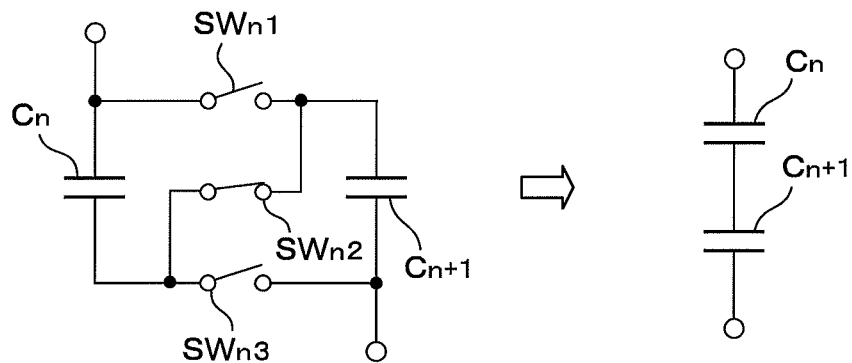
FIGS. 2A to 2C are diagrams showing examples of a circuit configured by the operation of the switch group.
Figure 2B:
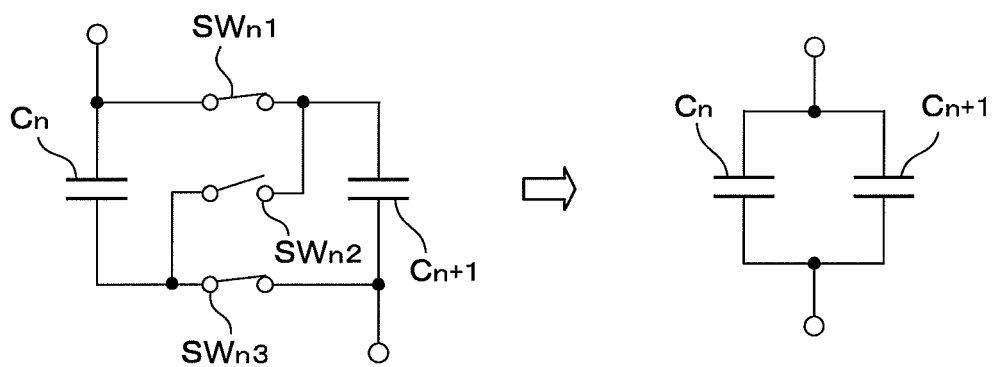
Figure 2C:
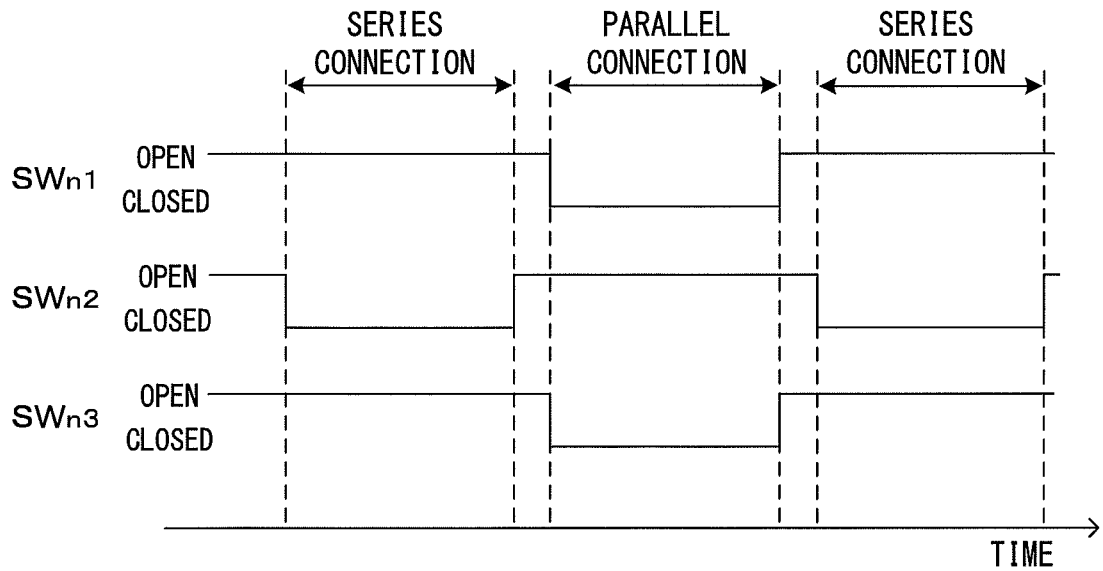

FIGS. 2A to 2C are diagrams showing examples of a circuit configured by the operation of the switch group. In a circuit having a minimum configuration composed of two electricity storage elements $C_n$, $C_{n+1}$ adjacent to each other in the circuit diagram and the switches $SW_{n1}$, $SW_{n2}$ and $SW_{n3}$ provided between them, series connection of the electricity storage elements $C_n$, $C_{n+1}$ is realized when the switches $SW_{n1}$, $SW_{n3}$ are open and the switch $SW_{n2}$ is closed as shown in FIG. 2A. On the other hand, as shown in FIG. 2B, parallel connection of the electricity storage elements $C_n$, $C_{n+1}$ is realized when the switches $SW_{n1}$, $SW_{n3}$ are closed and the switch $SW_{n2}$ is open.

As just described, the connection state of the electricity storage elements $C_n$, $C_{n+1}$ is switched between series connection and parallel connection by the open and closed states of the switches. In switching, it is necessary to prevent the switches $SW_{n1}$, $SW_{n2}$ and the switches $SW_{n2}$, $SW_{n3}$ from being both closed. Specifically, as shown in FIG. 2C, when connection is changed from series connection to parallel connection, the switches $SW_{n1}$, $SW_{n3}$ are closed after the switch $SW_{n2}$ is opened. On the other hand, when connection is changed from parallel connection to series connection, the switch $SW_{n2}$ is closed after the switches $SW_{n1}$, $SW_{n3}$ are opened.

The electricity storage element $C_n$ is short-circuited in a state where the switches $SW_{n1}$, $SW_{n2}$ are both closed, and the electricity storage element $C_{n+1}$ is short-circuited in a state where the switches $SW_{n2}$, $SW_{n3}$ are both closed. To prevent this, the switches need to be made at timings as described above. Note that opening and closing timings of the switches $SW_{n1}$, $SW_{n3}$ need not be necessarily simultaneous as long as the above conditions are met.

Similarly, also when the number of the electricity storage elements is three or more, the electricity storage elements $C_1$, $C_2$, $C_3$, ..., $C_N$ are electrically connected to each other by connecting two electricity storage elements adjacent in the circuit diagram to each other in series or parallel.

Figure 3A:
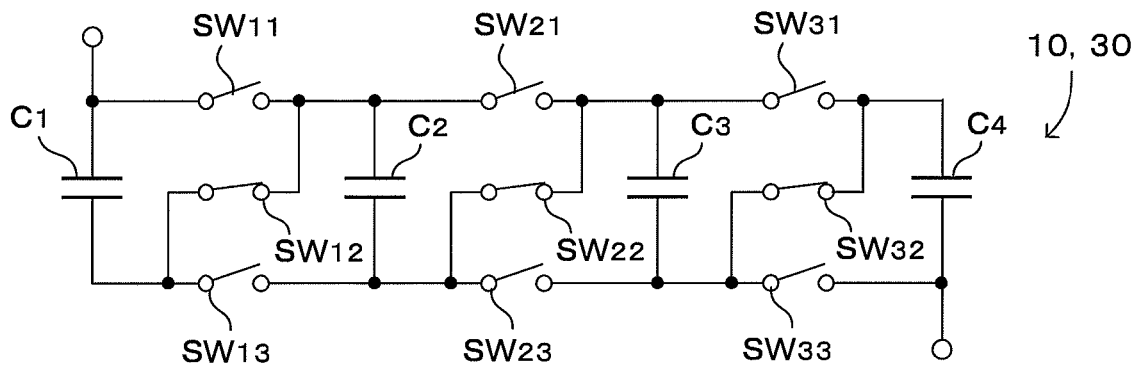
FIGS. 3A to 3C are diagrams showing examples of the connection state of electricity storage elements.
Figure 3B:
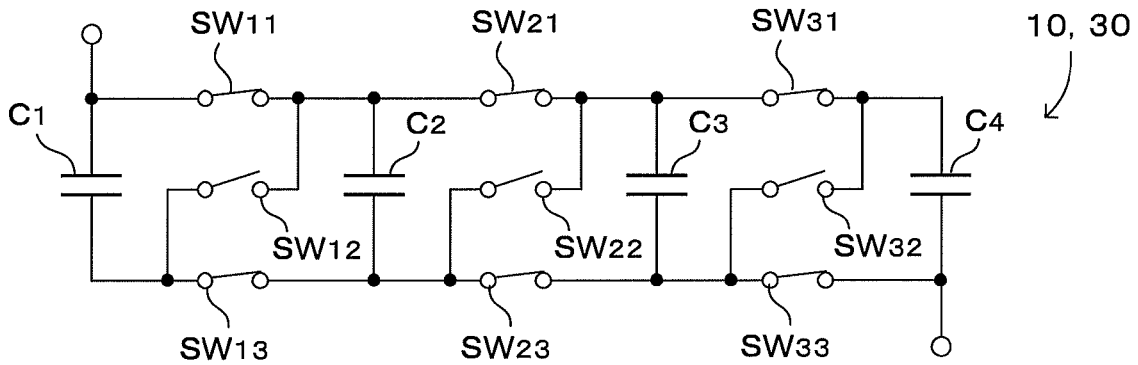
Figure 3C:
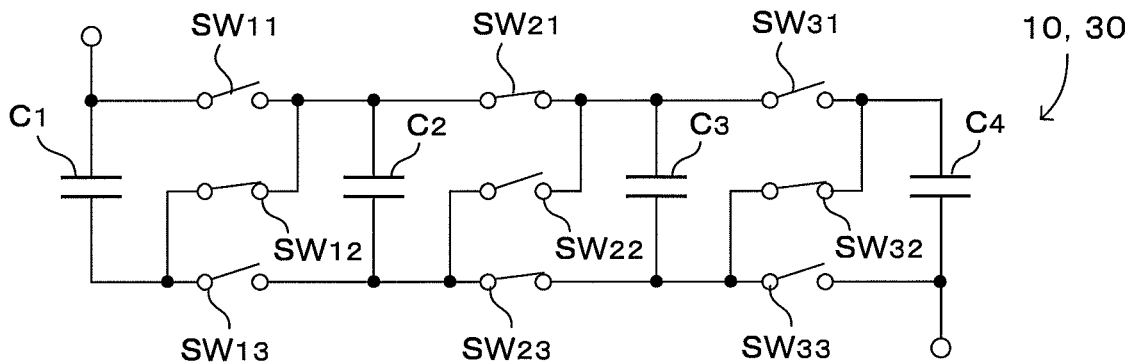

FIGS. 3A to 3C are diagrams showing examples of the connection state of electricity storage elements. Here is illustrated a case where the electricity storage 10 includes four electricity storage elements $C_1$ to $C_4$ (i.e. N=4). In the example shown in FIG. 3A, out of switch groups provided between the respective electricity storage elements, any of switches $SW_{n1}$ and $SW_{n3}$ (n=1,2,3) are open and any of switches $SW_{n2}$ are closed, and all the electricity storage elements $C_1$ to $C_4$ are connected in series. On the other hand, in the example shown in FIG. 3B, any of switches $SW_{n1}$ and $SW_{n3}$ (n=1,2,3) are closed and any of switches $SW_{n2}$ are open, and all the electricity storage elements $C_1$ to $C_4$ are connected in parallel.

Further, in the example shown in FIG. 3C, switches $SW_{12}$, $SW_{21}$, $SW_{23}$ and $SW_{32}$ are closed and the other switches are open. In this state, the electricity storage elements $C_2$, $C_3$ are connected in parallel and this parallel circuit is further connected in series to the electricity storage elements $C_1$ and $C_4$. As just described, this electricity storage device 1 is configured such that the electricity storage elements can be connected in various connection states by controlling the opening and closing of each switch.

Next, a charging operation by the electricity storage device 1 configured as described above is described. In this electricity storage device 1, the plurality of electricity storage elements $C_1$ to $C_N$ provided in the electricity storage 10 are connected to each other by the connection switcher 30 to configure a two-terminal circuit having an appropriate circuit configuration. By selectively supplying a dc constant current from the current source 21 or a dc constant voltage from the voltage source 22 to the two-terminal circuit thus configured, each electricity storage element of the electricity storage 10 is charged. As described later, the connection state of the electricity storage elements is switched to change the configuration of the two-terminal circuit as needed in the process of the charging operation of this electricity storage device 1.

Figure 4A:
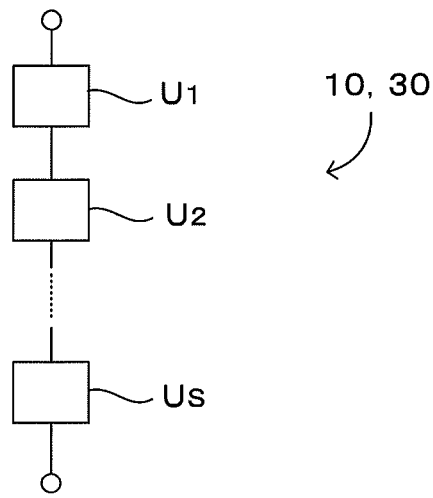
FIGS. 4A to 4C are diagrams showing connection states of the electricity storage elements in the charging operation.
Figure 4B:
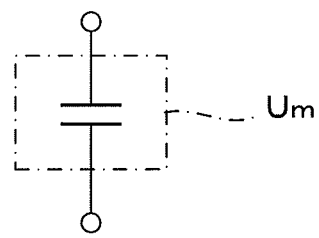
Figure 4C:
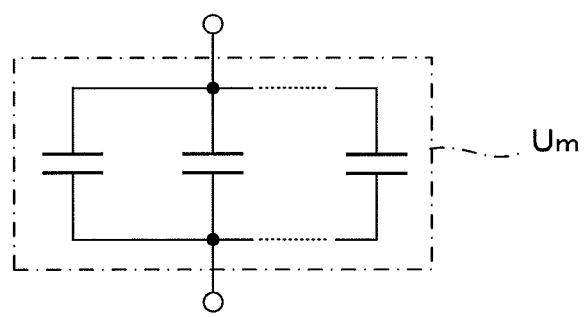

FIGS. 4A to 4C are diagrams showing connection states of the electricity storage elements in the charging operation. As described above, in the charging operation of this electricity storage device 1, the predetermined two-terminal circuit is configured by the electricity storage 10 and the connection switcher 30. This two-terminal circuit includes one or more unit circuits $U_1, U_2, \ldots, U_S$ (S is a natural number) having a predetermined circuit configuration and has such a circuit configuration that all the unit circuits are connected in series when there are a plurality of unit circuits. Each unit circuit $U_m$ (m=1, 2, ..., S) is either a circuit shown in FIG. 4B including a single electricity storage element or a circuit shown in FIG. 4C in which a plurality of electricity storage elements are connected to each other in parallel. A single two-terminal circuit may include a plurality of unit circuits having different circuit configurations. When all the electricity storage elements provided in the electricity storage device 10 are connected in parallel, all those elements are regarded to constitute a single unit circuit.

Further, it is assumed that all the electricity storage elements $C_1$ to $C_N$ included in the electricity storage 10 are incorporated into any of the unit circuits. Circuits including the electricity storage elements not involved in charging such as circuits in which at least one of the electricity storage elements $C_1$ to $C_N$ is short-circuited and circuits including electricity storage element(s) not included in a closed circuit formed when the current source 21 is connected do not fall under the two-terminal circuit mentioned here.

The above can also be rephrased as follows. A plurality of electricity storage elements connected to each other in parallel can be regarded as one "electricity storage element in a broad sense" having an electricity storage capacity obtained by adding electricity storage capacities of the electricity storage elements as a whole. A group of the plurality of electricity storage elements thus connected to each other in parallel and forming an electricity storage element in the broad sense corresponds to one unit circuit. On the other hand, a single electricity storage element not connected in parallel to other electricity storage elements singly configures one unit circuit. Such a unit circuit singly constitutes or a plurality of unit circuits connected in series constitute the two-terminal circuit mentioned in this embodiment.

Note that the unit circuit $U_m$ is not fixedly provided in this electricity storage device 1 and is rather temporally formed by the connection switcher 30 connecting the electricity storage elements $C_1, C_2, C_3, \ldots, C_N$ according to a control command from the controller 50. For example, when the electricity storage elements $C_1, C_2$ are connected in series by the switches $SW_{11}$ to $SW_{13}$ in the circuit of FIG. 1B, each of the electricity storage elements $C_1, C_2$ singly configures one unit circuit. On the other hand, when the electricity storage elements $C_1, C_2$ are connected in parallel by the switches $SW_{11}$ to $SW_{13}$, the electricity storage elements $C_1, C_2$ configure one unit circuit as a whole. As just described, the "unit circuit" and the "two-terminal circuit" in this embodiment are concepts indicating circuits which dynamically change according to a combination of the open/closed states of the respective switches of the connection switcher 30. Since N electricity storage elements are provided in the electricity storage 10, the number S of the unit circuits configured by at least some of these electricity storage elements is at most N.

Here, the number S of the unit circuits constituting the two-terminal circuit shown in FIG. 4A is referred to as a "series degree" of this two-terminal circuit. Note that, in the two-terminal circuit in which all the electricity storage elements $C_1$ to $C_N$ are connected in parallel, these electricity storage elements $C_1$ to $C_N$ constitute a single unit circuit, wherefore the series degree thereof is 1. As described above, in this electricity storage device 1, two-terminal circuits having various series degrees S ($1 \leq S \leq N$) can be realized by combinations of the open/closed states of the respective switches of the connection switcher 30.

FIGS. 5A to 5E are diagrams showing configuration examples of the two-terminal circuit. Here is illustrated a case where the electricity storage 10 includes eight electricity storage elements $C_1$ to $C_8$ (i.e. N=8). In the example shown in FIG. 5A, all the electricity storage elements $C_1$ to $C_8$ are connected in series and a value of the series degree S is 8. In this case, each of the electricity storage elements $C_1$ to $C_8$ singly configures one unit circuit.

Figure 5A:
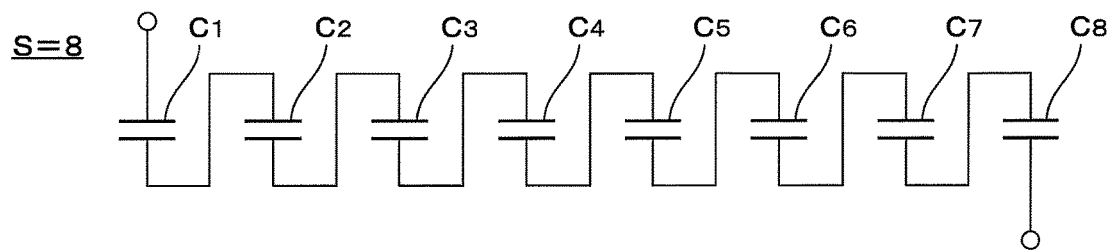
FIGS. 5A to 5E are diagrams showing configuration examples of the two-terminal circuit.
Figure 5B:
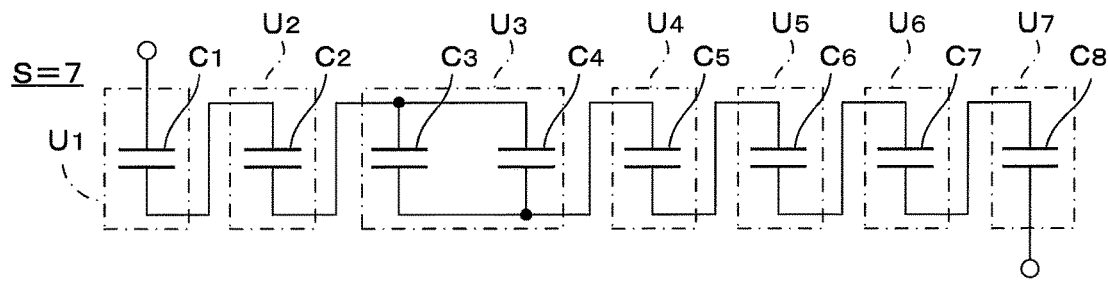

In the example shown in FIG. 5B, two electricity storage elements $C_3, C_4$ adjacent in the circuit diagram are connected in parallel and the other electricity storage elements are connected in series. In this case, a value of the series degree S is 7 and the two electricity storage elements $C_3, C_4$ configure one unit circuit $U_3$ and each of the other electricity storage elements singly configures one unit circuit $U_1, U_2, U_4$ to $U_7$. Note that as long as only two electricity storage elements are connected in parallel, a value of the series degree is 7 regardless of a combination of the electricity storage elements.

Figure 5C:
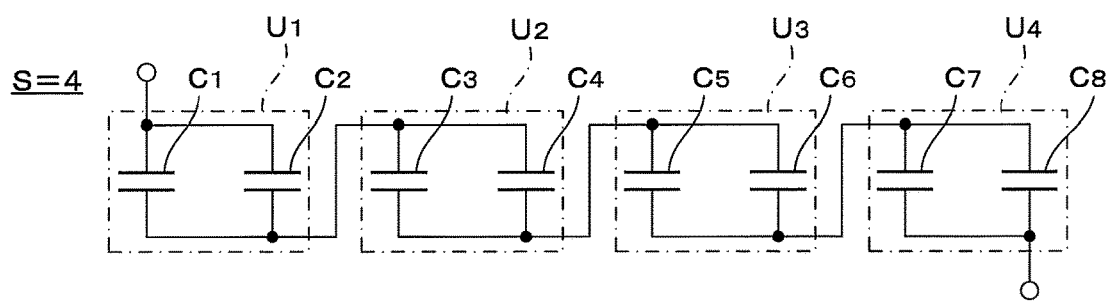

In the example shown in FIG. 5C, two each of electricity storage elements adjacent in the circuit diagram are connected in parallel. Specifically, electricity storage elements $C_1, C_2$ are connected in parallel to configure a unit circuit $U_1$, electricity storage elements $C_3, C_4$ are connected in parallel to configure a unit circuit $U_2$, electricity storage elements $C_5, C_6$ are connected in parallel to configure a unit circuit $U_3$ and electricity storage elements $C_7, C_8$ are connected in parallel to configure a unit circuit $U_4$. Then, four unit circuits $U_1$ to $U_4$ each composed of two electricity storage elements connected in parallel are connected in series to configure a two-terminal circuit. Therefore, a value of the series degree S in this case is 4.

Figure 5D:
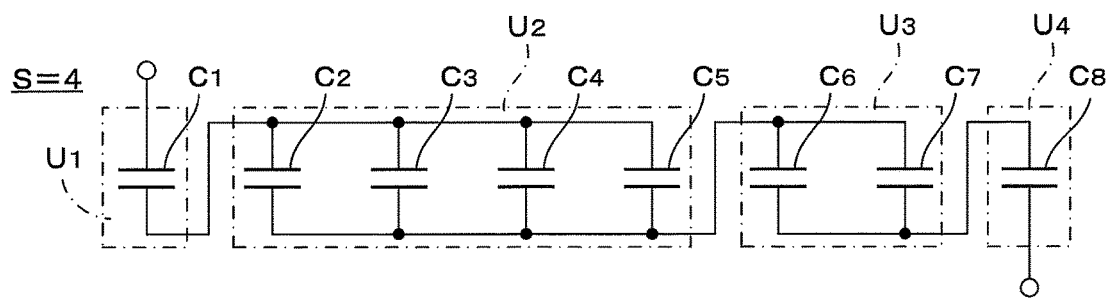

On the other hand, in the example shown in FIG. 5D, a value of the series degree S is 4 as in the example of FIG. 5C, but a circuit configuration is totally different. Specifically, each of electricity storage elements $C_1, C_8$ singly configures a unit circuit $U_1, U_4$, whereas four electricity storage elements $C_2$ to $C_5$ are connected to each other in parallel to configure a unit circuit $U_2$ and two electricity storage elements $C_6, C_7$ are connected to each other in parallel to configure one unit circuit $U_3$. Then, these unit circuits $U_1$ to $U_4$ are connected in series to configure a two-terminal circuit. As just described, there are cases where circuit configurations are different even if a value of the series degree S is the same.

Figure 5E:
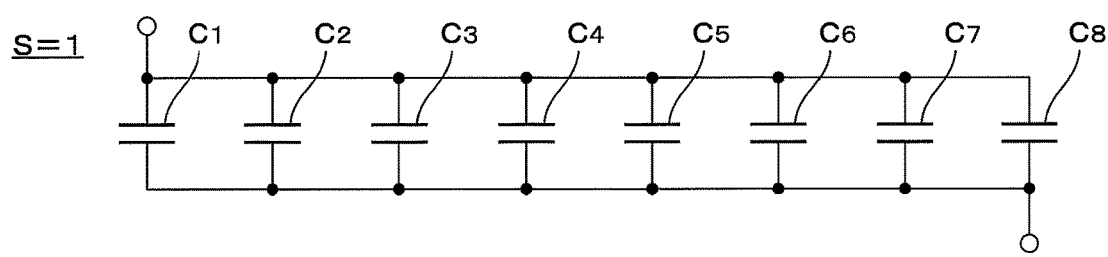

Furthermore, in the example shown in FIG. 5E, all electricity storage elements $C_1$ to $C_8$ are connected to each other in parallel to configure one unit circuit as a whole. Accordingly, in this case, a value of the series degree S is 1. As just described, in this electricity storage device 1, it is possible to configure various two-terminal circuits having an arbitrary series degree S of 1 to N. Further, it is possible to configure two or more types of two-terminal circuits having different circuit configurations for the same value of the series degree S except in cases where the series degree S is 1 or N. As described next, a plurality of types of two-terminal circuits having mutually different series degrees S successively appear in the operation process of the charging operation of this electricity storage device 1.

Figure 6:
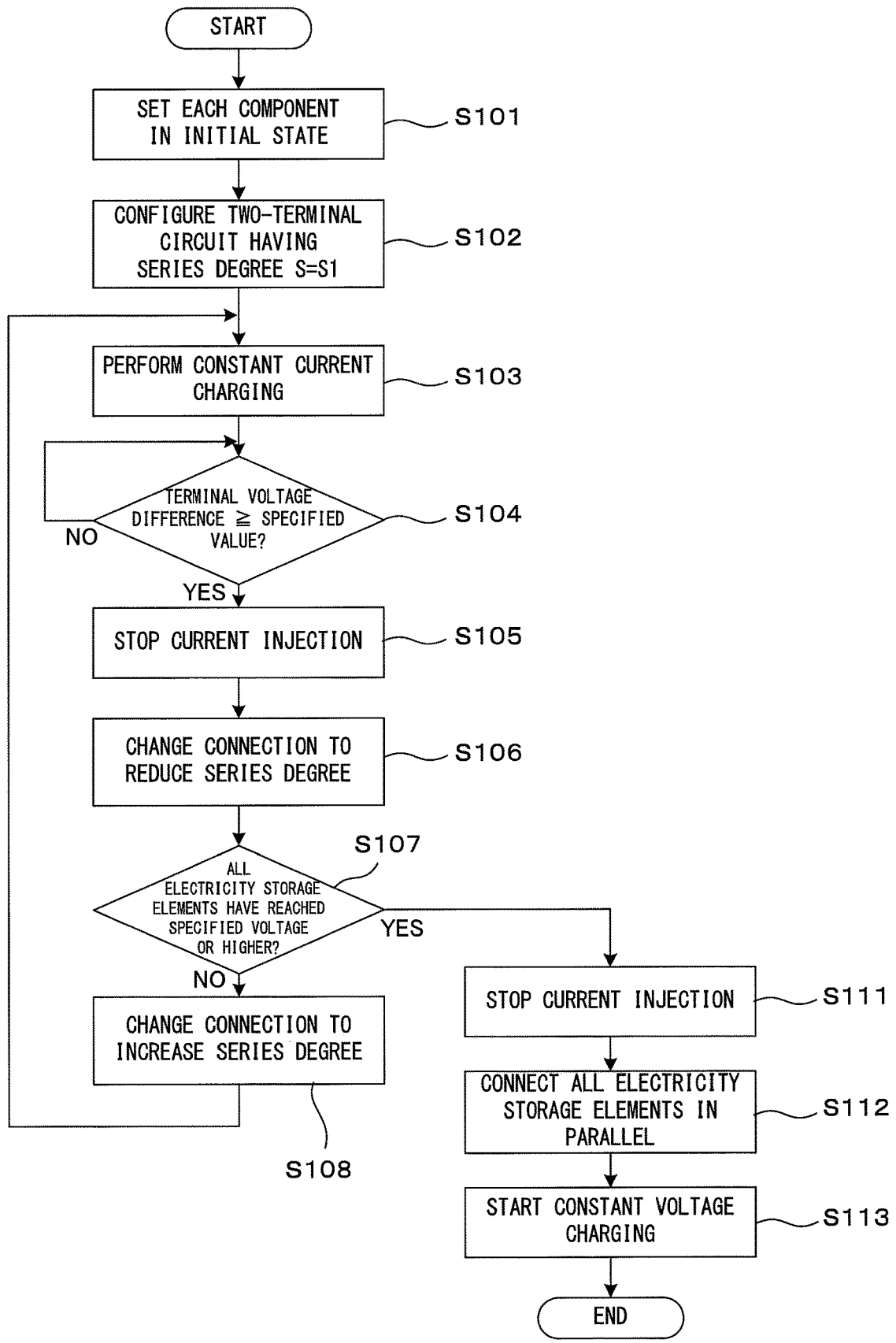
FIG. 6 is a flow chart showing an example of the charging operation in the electricity storage device.

FIG. 6 is a flow chart showing an example of the charging operation in this electricity storage device. This charging operation is realized by the controller 50 controlling each component of the device to perform a predetermined operation based on a control program created in advance.

First, each component of the device is set in a predetermined initial state to initialize the device (Step S101). In the initial state, switches provided in the power feeder 20 and the connection switcher 30 are all open. Thus, the electricity storage elements $C_1$ to $C_N$ provided in the electricity storage 10 are not charged. The electricity storage elements $C_1$ to $C_N$ may be in an uncharged or completely discharged state or some electrical energy may be stored in some or all of the electricity storage elements. Further, the detection of the terminal voltages of the electricity storage elements $C_1$ to $C_N$ by the potential detector 40 is started. Note that a connection state of the circuit before the start of charging is not limited to the above one and is arbitrary.

Subsequently, the controller 50 operates the connection switcher 30 and the connection switcher 30 connects the electricity storage elements $C_1$ to $C_N$ to each other to configure a first two-terminal circuit having the series degree S of a predetermined value S1 (Step S102). Then, the switch 23 of the power feeder 20 is closed in response to a control command from the controller 50, whereby a dc constant current is supplied from the current source 21 to the electricity storage 10 to start constant current charging of the electricity storage 10 (Step S103).

Although the series degree S1 at this time can be an arbitrary numerical value of not smaller than 2 and not larger than N, but is desirably as large a value as possible. In a state where the plurality of electricity storage elements are connected in parallel, the injected current is distributed to these electricity storage elements. Thus, it takes a long time to charge these. For the purpose of charging the plurality of electricity storage elements in a short time, it is preferable to connect as many electricity storage elements as possible in series (i.e. to set the series degree S high) and perform constant current charging. For example, if there is any electricity storage element in a partially charged state, charging may be started with this electricity storage element connected in parallel to another electricity storage element.

On the other hand, a degree of increase of the terminal voltage of each of the electricity storage elements connected in series and charged with the constant current is not necessarily uniform due to a capacity variation of the electricity storage elements. For example, electrochemical capacitors having an equal nominal capacity may have a capacity variation of about at most 20%. Thus, a variation of the terminal voltage among the electricity storage elements becomes gradually larger if charging is further continued.

In the case of executing a charging control on the basis of the electricity storage element having a high terminal voltage, charging is finished before the electricity storage element having a low terminal voltage reaches a fully charged state. On the other hand, in the case of executing the charging control on the basis of the electricity storage element having a low terminal voltage, the other electricity storage elements are excessively charged before that electricity storage element reaches a fully charged state. Either of these states is not preferable.

Accordingly, in the process of this charging operation, the terminal voltage of each electricity storage element $C_1$ to $C_N$ is monitored during charging. If a terminal voltage difference between the electricity storage elements becomes equal to or larger than a specified value set in advance (Step S104), the switch 23 is opened to stop the current injection from the current source 21 (Step S105). Then, the connection of the electricity storage elements is changed to reduce the series degree S by the connection switcher 30 and a second two-terminal circuit having a value of the series degree S smaller than the series degree S1 of the first two-terminal circuit is newly configured (Step S106). The series degree S at this time is S2 (<S1).

When the connection is changed to reduce the series degree S of the two-terminal circuit, at least a pair of electricity storage elements not connected in parallel immediately before a change are newly connected in parallel. By newly connecting the electricity storage elements in parallel, a terminal voltage variation between those electricity storage elements is corrected. Thus, a connection change of the electricity storage elements to reduce the series degree S of the two-terminal circuit acts to reduce a voltage variation among the electricity storage elements.

Various circuit configurations can be assumed as the two-terminal circuit having a lower series degree S than the first two-terminal circuit and any of those may be set as the second two-terminal circuit. However, if at least one of the electricity storage element having a highest terminal voltage and the electricity storage element having a lowest terminal voltage out of the plurality of electricity storage elements are connected to another electricity storage element in parallel, an effect of correcting a voltage variation is particularly notable.

The current injection is stopped prior to the change of the connection of the two-terminal circuit in order to prevent the breakage of the switches due to the flow of an excessive current into the switches caused by the superimposition of a transient current flowing between the electricity storage elements when the electricity storage elements having different terminal voltages are connected in parallel and the charging current. If there is no possibility of the occurrence of such a problem such as when current capacities of the switches are sufficiently large, the current injection may be continued. Specifically, Step S105 may be omitted.

Whether or not the voltage variation among the electricity storage elements has been solved can be checked, for example, by comparing the terminal voltage of each electricity storage element detected by the potential detector 40. Specifically, the voltage variation can be considered to have been solved when a voltage difference between the highest and lowest terminal voltages of the electricity storage elements is smaller than a specified value. The specified value in this case may be the same value as or smaller than the specified value in Step S104.

Further, a time until the terminal voltages become equal among the electricity storage elements when the plurality of electricity storage elements having different terminal voltages are connected in parallel depends on the magnitude of a time constant determined by the capacities of the electricity storage elements and electrical resistance of a wiring. Thus, an approximate time can be predicted from characteristics of each component. From this, a time for maintaining the circuit configuration formed in Step S106 may be determined in advance and the connection state may be maintained only for the determined time.

When the voltage variation among the electricity storage elements is solved by configuring the two-terminal circuit having a low series degree, it is subsequently judged whether or not the terminal voltages of all the electricity storage elements have reached a predetermined specified voltage or higher (Step S107). The specified value in this case is a value corresponding to the terminal voltage of the electricity storage elements when each electricity storage element is regarded to be substantially fully charged. For example, a voltage value of about 90% to 95% of the terminal voltage of the electricity storage element in the fully charged state can be set as the specified voltage.

When the terminal voltages of all the electricity storage elements are not lower than the specified voltage (YES in Step S107), the switch 23 is opened to stop the current injection (Step S111) if the current injection from the current source 21 has been continued, and the connection is changed to connect all the electricity storage elements in parallel (Step S112). Then, the switch 24 of the power feeder 20 is closed and the dc constant voltage from the voltage source 22 is applied to each electricity storage element (Step S113).

By connecting all the electricity storage elements in parallel and applying the dc constant voltage, the following effects are obtained. By setting the magnitude of the dc voltage at this time as a final target voltage value of each electricity storage element, the terminal voltage of each electricity storage element is automatically adjusted to the target voltage. This makes the terminal voltage of each electricity storage element in the substantially fully charged state uniform and prevents a terminal voltage reduction due to self-discharge of the electricity storage elements. These effects are obtained by properly maintaining the magnitude of the dc voltage output by the voltage source 22 and the detection of the terminal voltages of the individual electricity storage elements and a control based on that are not particularly necessary.

In this state, a series of steps of the charging operation are finished and, thereafter, a trickle charging state in which only a current for compensating for self-discharge of the electricity storage elements flows into the electricity storage 10 is set and each electricity storage element is maintained in the fully charged state.

On the other hand, if the terminal voltage of any one of the electricity storage elements has not reached the specified voltage (NO in Step S107), the connection of the electricity storage elements is changed by the connection switcher 30 and a third two-terminal circuit having a series degree S3 (>S2) higher than the series degree S2 of the second two-terminal circuit is newly configured (Step S108). Then, a return is made to Step S103 and constant current charging is further performed. In this way, the charging of the electricity storage element(s) having not been fully charged yet is continued. By increasing the series degree S of the two-terminal circuit, a time required until each electricity storage element is brought to the fully charged state can be shortened.

The circuit configuration of the third two-terminal circuit is not particularly limited. However, it is, for example, desirable that the electricity storage element judged to have a terminal voltage below the specified voltage in Step S107 is not connected in parallel to another electricity storage element. By doing so, it is possible to quickly increase the terminal voltage by causing the current to efficiently flow into this electricity storage element. On the other hand, by connecting the electricity storage element having the terminal voltage not lower than the specified voltage to another electricity storage element in parallel, the voltage variation can be corrected and excessive charging can be prevented. The controller 50 preferably grasps the terminal voltage of each electricity storage element $C_1$ to $C_N$ as needed from the detection result by the potential detector 40, determines how to connect each electricity storage element according to that result and controls the connection switcher 30.

Note that the series degree S3 and the circuit configuration of the third two-terminal circuit configured in Step S108 may be the same as or different from the series degree S1 and the circuit configuration of the first two-terminal circuit configured in Step S102. Further, the series degree may be the same as that of the first two-terminal circuit, but the circuit configuration may be different.

Further, when a processing loop of Steps S103 to S108 is performed a plurality of times, Steps S106 and S108 associated with the circuit connection change are respectively performed a plurality of times. At this time, the series degree S2 and the circuit configuration of the second two-terminal circuit configured in Step S106 may be the same or different in each processing. However, in terms of correcting the voltage variation among the respective electricity storage elements, two-terminal circuits having variously different circuit configurations preferably successively appear. This is because the terminal voltages of the respective electricity storage elements are made uniform to each other by successively changing a combination of the electricity storage elements connected in parallel.

Further, the series degree S3 and the circuit configuration of the third two-terminal circuit configured in Step S108 also may be the same or different in each processing. However, in terms of shortening a time required for charging, the series degree S is preferably set to be as high as possible.

Note that, in a mode in which a second step and a third step are repeatedly performed a plurality of times, it is effective in some cases not to largely change the series degree S between the second and third steps. The connection change associated with a change of the series degree S causes fluctuations of voltages at both ends of the two-terminal circuit. For example, when it is necessary to suppress the fluctuations of the voltages at the both ends of the two-terminal circuit such as when power is supplied to an external load from the electricity storage 10 during the charging operation, it is effective to make a change of the series degree S between the second and third steps relatively small.

As just described, in this charging operation, constant current charging is started in a state where the electricity storage elements $C_1$ to $C_N$ provided in the electricity storage 10 are connected to have a relatively high series degree S=S1. At a predetermined timing, more specifically, when the terminal voltage differences among the electricity storage elements become equal to or larger than a specified value, the connection of the electricity storage elements is changed to configure a new two-terminal circuit having a series degree S=S2 (<S1). By reducing the series degree of the two-terminal circuit, a voltage balance among the electricity storage elements is improved.

If each electricity storage element has not been fully charged yet, more specifically if there is any electricity storage element whose terminal voltage has not reached the specified voltage after the voltage variation is corrected, the connection of the electricity storage elements is changed again to configure a new two-terminal circuit having a series degree S=S3 (>S2). By increasing the series degree of the two-terminal circuit, a charging speed into each electricity storage element is improved. By alternately performing the connection change associated with an increase of the series degree S and the connection change associated with a reduction of the series degree a plurality of times if necessary, the respective electricity storage elements are successively fully charged while the voltage variation among the electricity storage elements is suppressed.

As just described, in the process of this charging operation, the connection change associated with a reduction of the series degree and the connection change associated with an increase of the series degree are alternately performed after the start of charging. This enables each electricity storage element to be charged in a short time while voltages are balanced among the electricity storage elements. Although a connection change of the electricity storage elements is made in the charging process in any of the prior arts described above, no connection change of the electricity storage elements associated with an increase of the series degree is made. Thus, the charging operation of this embodiment is more advantageous than those of the prior arts in enabling charging in a short time.

Figure 7:
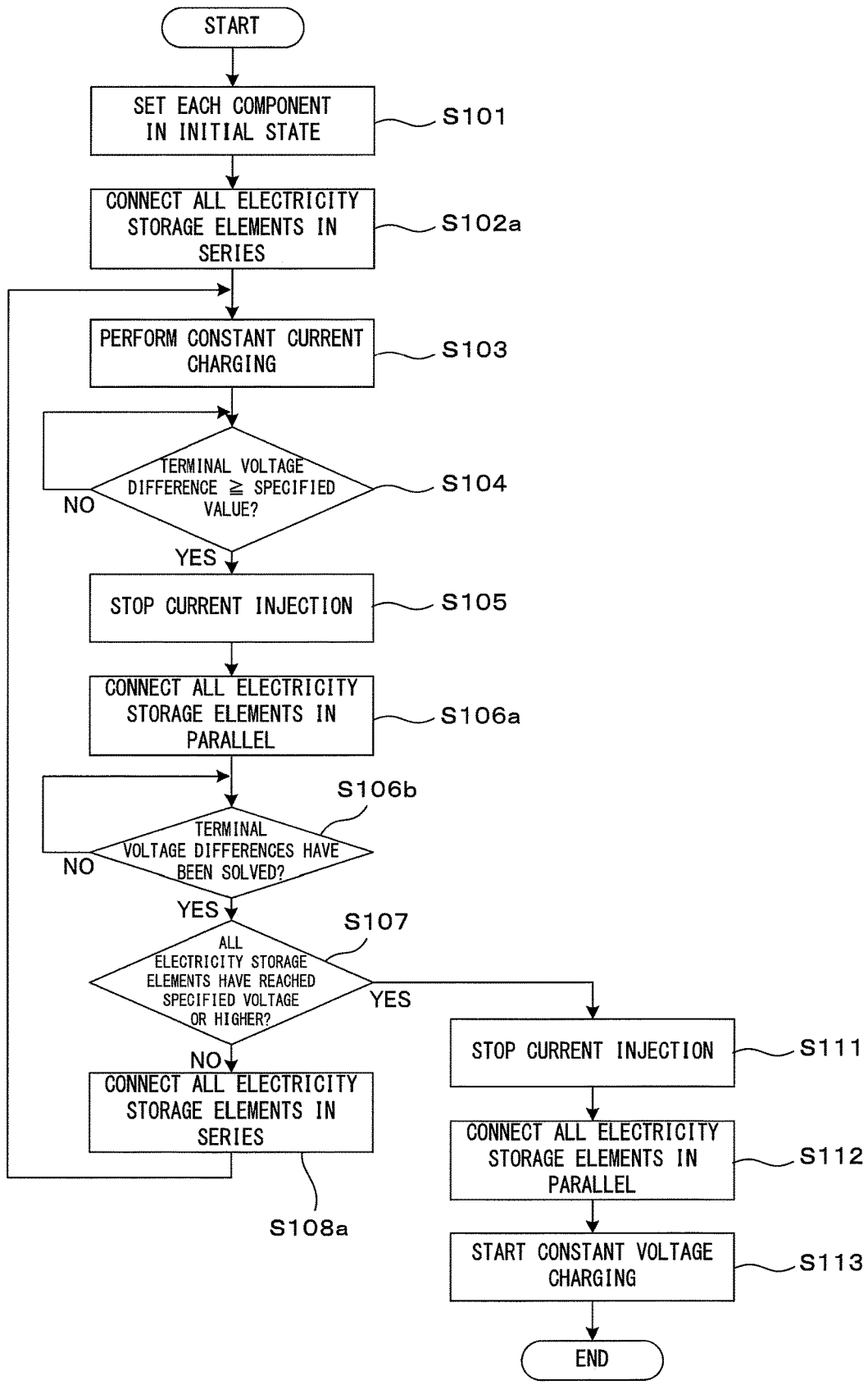
FIG. 7 is a flow chart showing a specific mode of the charging operation.

FIG. 7 is a flow chart showing a specific mode of the charging operation. In FIG. 7, operation steps basically the same as those of the charging operation shown in FIG. 6 are denoted by the same reference signs as in FIG. 6 and those operation contents are not described below. In this mode, operation contents of Step S102a differ from those of Step S102 of FIG. 6 in configuring a two-terminal circuit in which all the electricity storage elements $C_1$ to $C_N$ are connected in series. Further, Steps S106a and S106b are provided instead of Step S106 of FIG. 6. Further, a two-terminal circuit in which all the electricity storage elements are connected in series is configured also in Step S108a. Excluding these points, the operation contents of the charging operation of FIG. 7 are the same as those of the charging operation of FIG. 6.

In Step S106a, a two-terminal circuit in which all the electricity storage elements $C_1$ to $C_N$ are connected in parallel is configured as a two-terminal circuit having a low series degree. In Step S106b, whether or not terminal voltage differences among the electricity storage elements have been solved is judged from the terminal voltage detection result of each electricity storage element by the potential detector 40 and it is waited until the terminal voltage differences are solved. Further, as described above, the connection state may be maintained for a fixed time without depending on the terminal voltages.

That is, in the operation mode shown in FIG. 7, when each electricity storage element is connected and a two-terminal circuit having a high series degree S is configured, a two-terminal circuit having, in principle, a highest series degree S in a state where all the electricity storage elements are connected in series (hereinafter, referred to as a "total series state") is configured. On the other hand, when the series degree S of the two-terminal circuit is reduced, a two-terminal circuit having, in principle, a lowest series degree S in a state where all the electricity storage elements are connected in parallel (hereinafter, referred to as a "total parallel state") is configured.

This causes, in this mode, constant current charging to be started with the electricity storage elements $C_1$ to $C_N$ shown in FIG. 5A in the total series state (i.e. series degree S=N) and the connection of the electricity storage elements $C_1$ to $C_N$ to be changed to the total parallel state (i.e. series degree S=1) shown in FIG. 5E at a predetermined timing. In Step S108a thereafter, the connection is changed to a totally series connection state shown in FIG. 5A again. Note that although the number N of the electricity storage elements provided in the electricity storage 10 is 8 in the examples of FIGS. 5A to 5E, a similar process is possible at an arbitrary number N.

As just described, in the charging operation (FIG. 7) of this mode, the charging of the electricity storage elements proceeds while the total series state shown in FIG. 5A and the total parallel state shown in FIG. 5E are alternately switched. Constant current charging in the total series state is a mode in which charging to the individual electricity storage elements proceeds at a fastest rate. On the other hand, the total parallel state is a mode in which the terminal voltages are reliably made uniform among all the electricity storage elements in a shortest time. Thus, in the charging operation of this mode, each electricity storage element can be charged in a short time while voltages are balanced among the electricity storage elements. Note that, in this mode, judgment of Step S107 is made with all the electricity storage elements connected in parallel and the terminal voltage differences of the respective electricity storage elements solved. Thus, in Step S107, the terminal voltages of all the electricity storage elements need not be detected and judgment may be made based on the terminal voltage of any one of the electricity storage elements or the voltages at both ends of the electricity storage 10 as a whole.

The "connection of the electricity storage elements into the total series state" in Steps S102a and S108a of FIG. 7 is nothing but one mode of "connection into a more series state" in Steps S102 and S108 of FIG. 6. Similarly, the "connection of the electricity storage elements into the total parallel state" in Step S106a of FIG. 7 is nothing but one mode of "connection into a less series state" in Step S106 of FIG. 6. In this sense, the charging operation of FIG. 7 can be said to be the limitation of a technical concept of the charging operation of FIG. 6 to a more specific mode.

FIG. 8 is a flow chart showing a part of a modification of the charging operation of FIG. 6. Steps S106c to S106e shown in FIG. 8 may be performed instead of Step S106 of FIG. 6. In Step S106c, a connection change to reduce the series degree S of the two-terminal circuit configured by the electricity storage elements is made as in Step S106 of FIG. 6. In Step S106d, whether or not the terminal voltage differences among the electricity storage elements have been solved is judged. If the terminal voltage differences have been solved, processings in and after Step S107 of FIG. 6 are performed.

Unless the terminal voltage differences have been solved, a connection change of the electricity storage elements is made in Step S106e. If the two-terminal circuit formed in Step S106c is not in the total parallel state, the terminal voltage difference between the electricity storage elements not connected in parallel may not be possibly solved depending on a combination of the electricity storage elements connected in parallel. A connection change to change the combination of the electricity storage elements connected in parallel is effective in such a case. The connection change for the purpose of solving the terminal voltage differences among the electricity storage elements desirably maintains or reduces the series degree S of the two-terminal circuit thereby. By repeating Steps S106d, S106e until the terminal voltage differences are solved, the terminal voltage differences among the electricity storage elements can be reliably solved.

As just described, a plurality of types of two-terminal circuits having different circuit configurations may be successively formed in the process of reducing the series degree of the two-terminal circuit to balance the voltages among the electricity storage elements. The following mode is also possible based on a similar concept.

Figure 9:
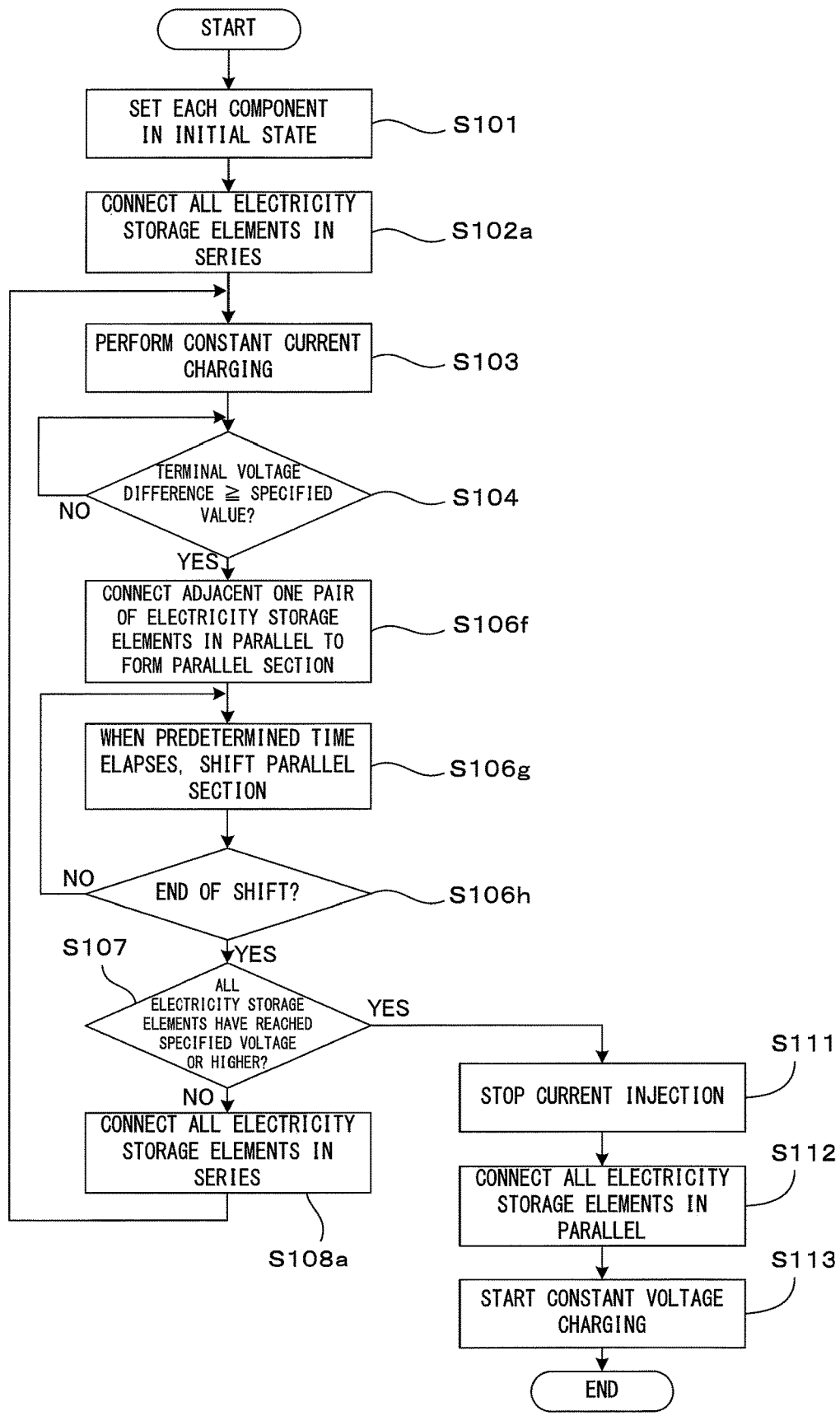
FIG. 9 is a flow chart showing another specific mode of the charging operation.

FIG. 9 is a flow chart showing another specific mode of the charging operation. Further, FIGS. 10A to 10E are diagrams showing a transition of the connection state of the electricity storage elements in this operation mode. Operation contents of Steps S101 to S104 in FIG. 9 are the same as those of Steps S101 to S104 in FIG. 7. Specifically, in this mode, the electricity storage elements are connected into the total series state shown in FIG. 5A and constant current charging is started (Steps S101 to S103) and this state is maintained until the terminal voltage differences among the electricity storage elements reach the specified value (Step S104).

Figure 10A:
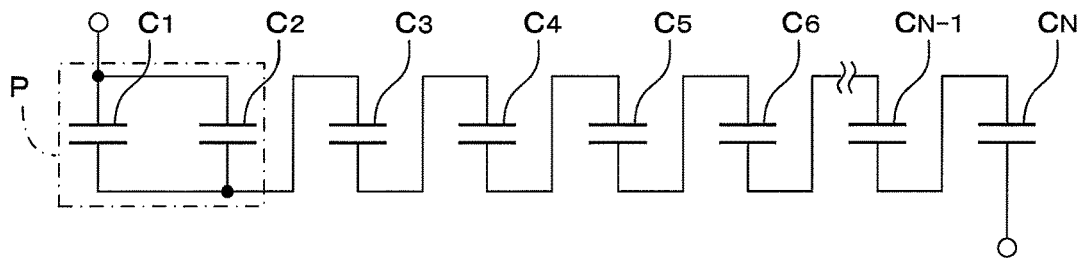
FIGS. 10A to 10E are diagrams showing a transition of the connection state of the electricity storage elements in the operation mode.

Subsequently, the connection of a pair of electricity storage elements adjacent in the circuit diagram, e.g. electricity storage elements $C_1$, $C_2$ as shown FIG. 10A, out of the electricity storage elements $C_1$ to $C_N$ in the total series state is changed to parallel connection (Step S106f). This makes the terminal voltages uniform between the electricity storage elements $C_1$ and $C_2$. The pair of electricity storage elements connected to each other in parallel in this way is referred to as a "parallel section" and denoted by P in the figures. Although the electricity storage elements forming the parallel section P are selected based on the arrangement in the circuit diagram here, there is no limitation to this. For example, the parallel section P may be formed by one electricity storage element having a highest or lowest terminal voltage and one electricity storage element adjacent to the former electricity storage element in the circuit diagram. By doing so, a time required to solve the terminal voltage difference can be shortened. Particularly, by connecting the electricity storage element having a highest terminal voltage to another electricity storage element in an early stage, excessive charging can be prevented.

The connection change of the electricity storage elements at this time is for reducing the series degree S by one from the total series state and the connection state of one pair of the electricity storage elements is only changed from serial connection to parallel connection. Therefore, a transient current flowing due to the change to the parallel connection is also thought to be limited. Thus, the current injection from the current source 22 needs not be stopped in this case. Rather, by continuing the current injection, charging into the pair of electricity storage elements and the other electricity storage elements can be continued also while the terminal voltages are made uniform between the pair of electricity storage elements. Thus, a time required for charging can be made shorter.

Figure 10B:
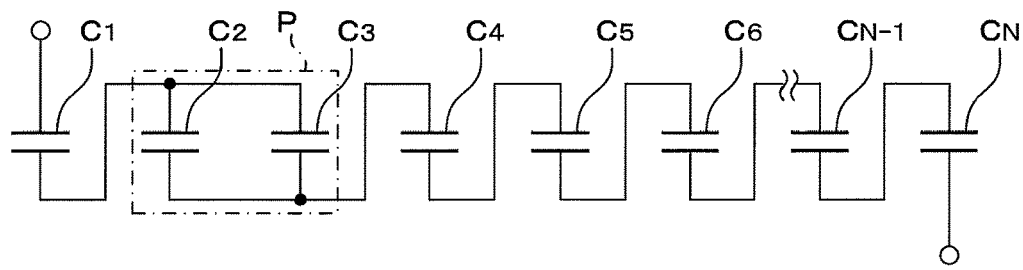

When a predetermined time elapses after the connection change, a new two-terminal circuit is configured by shifting a combination of the electricity storage elements constituting the parallel section P by one (Step S106g). Here, the shift of the parallel section means to form a new parallel section P by one of the two electricity storage elements constituting the parallel section P and another electricity storage element adjacent to this electricity storage element in the circuit diagram by changing the connection of the electricity storage elements. In a case where the parallel section P is formed by two electricity storage elements $C_1$, $C_2$ as shown in FIG. 10A, an operation of cancelling and changing parallel connection between the electricity storage elements $C_1$ and $C_2$ to serial connection and forming a new parallel section P of one electricity storage element $C_2$ and another electricity storage element $C_3$ adjacent to this corresponds to the shift of the parallel section P as shown in FIG. 10B. Note that the shift may be made when a terminal voltage difference between the electricity storage elements forming the parallel section P falls to or below a predetermined value.

Figure 10C:
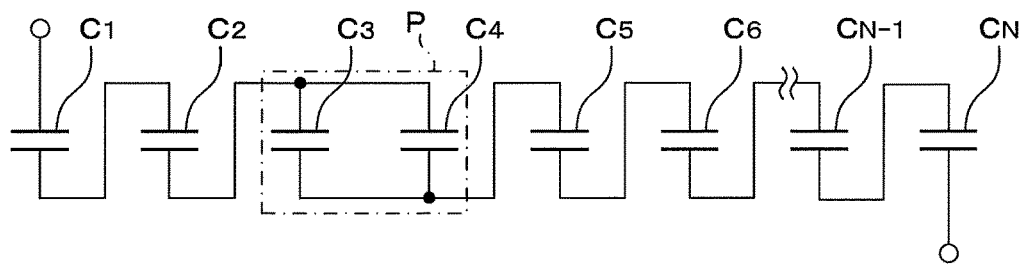
Figure 10D:
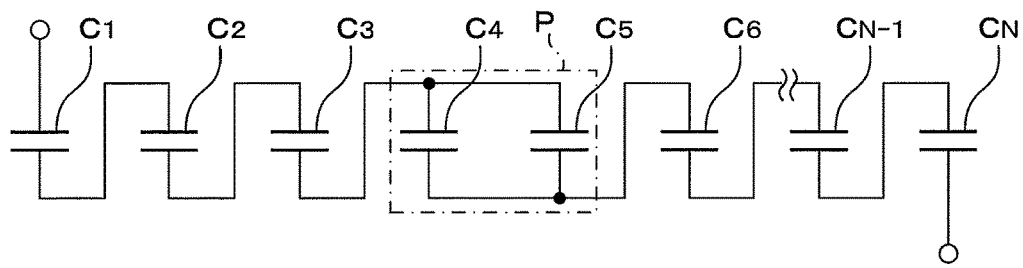

The shift of the parallel section P described above is repeated until a predetermined shift end condition holds (Step S106h). At this time, a pair of electricity storage elements forming the parallel section P is shifted one by one in the circuit diagram as shown in FIGS. 10C and 10D. In this way, a voltage variation among the electricity storage elements is corrected. Also during this time, charging into the electricity storage elements can proceed by continuing the current injection into each electricity storage element.

Various shift end conditions are considered. For example, the shift may be ended when the terminal voltage differences among the respective electricity storage elements detected by the potential detector 40 is solved. Further, the shifting operation may be ended after the parallel section P is formed for all the pairs of electricity storage elements adjacent in the circuit diagram.

Figure 10E:
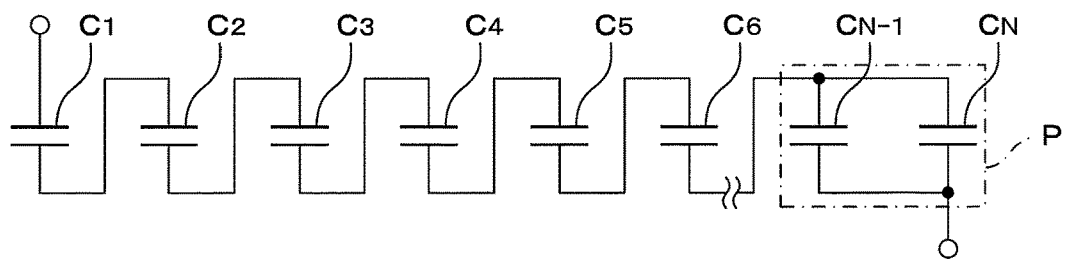

Note that when the parallel sections are successively shifted as described above, the shift is finally ended at the parallel section formed by the electricity storage elements $C_{N-1}$, $C_N$ paired on the rightmost end in the circuit diagram as shown in FIG. 10E. In the case of further continuing the shifting operation from this state, the parallel sections P may be successively shifted again from the state shown in FIG. 10A or may be shifted from the state shown in FIG. 10E toward the state shown in FIG. 10A in an order opposite to the above. Further, as described in the aforementioned prior art (WO2012/014281), a switch for forming the parallel section P by two most distant electricity storage elements $C_1$, $C_N$ may be provided between these electricity storage elements in the circuit diagram so that the circulation of the parallel sections P is possible.

When the shifting operation of the parallel sections P is finished, whether or not the terminal voltages of all the electricity storage elements are not lower than the specified voltage is subsequently judged as in Step S107 of FIGS. 6 and 7 (Step S107). The operations thereafter are the same as in the charging operation shown in FIG. 7. Specifically, when the voltage variation is solved among the electricity storage elements, the electricity storage elements are returned to the total series state to increase the series degree S of the two-terminal circuit. In this way, it can be prevented that a time required for charging becomes longer by distribution of the current caused by forming the parallel sections. Further, if the terminal voltages of all the electricity storage elements are equal to or larger than the specified voltage, all the electricity storage elements are connected in parallel to enter the trickle charging state.

As just described, in the charging operation (FIG. 9) of this mode, the parallel section P by a pair of electricity storage elements is formed to make the terminal voltages uniform and the parallel sections P are successively shifted when the terminal voltage differences among the electricity storage elements become larger during constant current charging in the total series state. In this way, a voltage balance among the electricity storage elements is improved. When the terminal voltage differences between the electricity storage elements are solved, a return is made to the total series state again, thereby shortening the time required for charging.

Note that a technical concept of forming a parallel section by some electricity storage elements and shifting the parallel section to solve terminal voltage differences among the electricity storage elements has a certain similarity to the technical concept described in aforementioned prior art (WO2012/014281). However, in this prior art, there is no phase of transition from a state where the parallel section is temporarily formed to the total series state unlike the charging operation of FIG. 9. Because of this difference, the charging operation of FIG. 9 is better than the prior art in shortening the time required for charging. In other words, the charging operation shown in FIG. 9 can be said to correspond to an improvement of the prior art in terms of the charging speed.

The charging operation of FIG. 9 can be thought to correspond to a modification of the operation of successively changing the circuit configuration without changing the series degree S of the two-terminal circuit when the terminal voltage differences among the electricity storage elements are not solved in Step S106 of the charging operation of FIG. 6. In this sense, the charging operation of FIG. 9 can be said to be a modification of the charging operation of FIG. 6.

Although the parallel sections P are formed in an order in accordance with an arrangement order of the electricity storage elements in the circuit diagram in the above mode, the parallel sections P may be formed and the shifting operation may be performed as follows as a modification. A basic concept is to form the parallel section P by a pair of electricity storage elements adjacent in the circuit diagram and having a largest terminal voltage difference. Specifically, in Step S106f, the parallel section P is formed by the pair of adjacent electricity storage elements having a largest terminal voltage difference based on a terminal voltage detection result of each electricity storage element. In this way, the terminal voltage difference between this electricity storage element pair is solved.

In Step S106f, a new parallel section P is formed of a pair of adjacent electricity storage elements having a largest terminal voltage difference at that time, whereby the position of the parallel section is shifted. By successively connecting pairs of electricity storage elements in parallel from the one having a largest terminal voltage difference, the voltage variation among the electricity storage elements can be solved in a short time.

As described above, in the above embodiment, the connection switcher 30 functions as a "connector" of the invention, whereas the current source 21 and the voltage source 22 respectively function as a "current injector" and a "voltage applier" of the invention.

Further, any of Steps S102 and S103 of FIG. 6 and S102a and S103 of FIGS. 7 and 9 corresponds to a "first step" of the invention. Further, any of Step S106 of FIG. 6, Steps S106a to S106b of FIG. 7, Steps S106c to S106e of FIG. 8 and Steps S106f to S106h of FIG. 9 corresponds to a "second step" of the invention. Further, any of Step S108 of FIG. 6 and Steps S108a of FIGS. 7 and 9 corresponds to a "third step" of the invention. Further, Steps S112 to S113 of FIGS. 6, 7 and 9 correspond to a "fourth step" of the invention.

As described above, in this embodiment, the value of the series degree S is initially set to be relatively high in injecting the charging current into the two-terminal circuit configured by the plurality of electricity storage elements $C_1$ to $C_N$ and performing charging (first step). When the voltage variation among the electricity storage elements becomes larger as charging proceeds, connection is changed to configure a two-terminal circuit having a lower series degree S, thereby improving the voltage variation among the electricity storage elements (second step). When the voltage variation becomes smaller, a two-terminal circuit having a high series degree S is configured again, whereby charging into each electricity storage element proceeds in a short time (third step). As just described, according to this embodiment, each electricity storage element can be brought to the fully charged state in a short time while voltages are balanced among the plurality of electricity storage elements.

Further, by making the connection change of the electricity storage elements to reduce the series degree of the two-terminal circuit again (second step) after the third step of increasing the series degree of the two-terminal circuit, a terminal voltage variation among the electricity storage elements possibly occurring in the third step can be suppressed. In this case, a combination of the electricity storage elements to be connected in parallel may be changed every time the second step is performed. In this way, it can be more reliably realized to make the terminal voltage of each electricity storage element uniform as compared to the case where the combination is fixed.

Further, in the configuration in which the second and third steps are alternately executed a plurality of times as needed, charging can proceed while the voltage variation among the electricity storage elements is suppressed within a predetermined range in the entire process of the charging operation. In this case, the connection change to increase the series degree corresponds to a transition from the second step to the third step and the connection change to reduce the series degree corresponds to a transition from the third step to the second step. The series degree may be changed between the second steps executed a plurality of times and the series degree may also be changed between the third steps executed a plurality of times. As a result, the series degree of the two-terminal circuit in the second step executed at a certain timing may possibly become larger than the series degree in the third step executed at a timing not immediately preceding or following the former timing, but this is permissible.

Further, one second step may be configured such that the circuit configuration of the two-terminal circuit successively changes (FIGS. 8 and 9). In this case, it is desirable to make such a connection change to maintain the series degree constant or reduce the series degree. In this way, the terminal voltage variation among the respective electricity storage elements can be efficiently corrected.

Further, after each electricity storage element is charged by executing the second and third steps, all the electricity storage elements are connected in parallel and constant current charging is executed (fourth step). In this way, the state where the terminal voltage of each electricity storage element is made uniform is maintained and a voltage drop due to self-discharge of the electricity storage elements can be compensated.

Further, the fourth step is executed when the terminal voltages of all the electricity storage elements become equal to or higher than the specified voltage. In the case of performing constant current charging in a state where the terminal voltages of the electricity storage elements are low, a large current flows into the electricity storage elements in a short time. Particularly, with the plurality of electricity storage elements connected in parallel, the voltage supply for performing charging needs to have a very large current supply ability and components on a current path also need to have large current capacities. By performing constant current charging with the terminal voltages of the electricity storage elements sufficiently increased, it is unnecessary to deal with such a transient large current.

Further, the second step may be executed without the current being injected into the electricity storage elements (FIGS. 6 and 7). The time required for charging can be shortened by performing the current injection into the electricity storage elements also in the second step. However, when a plurality of electricity storage elements possibly having different terminal voltages are connected in parallel, a transient current due to a voltage difference may flow between the electricity storage elements. Since this current is superimposed on the charging current injected from outside, the components on the current path need to have large current capacities. If a change is made to parallel connection without the current injection into the electricity storage elements, such a problem does not occur.

Further, in the mode in which all the electricity storage elements are connected in parallel in the second step (FIG. 7), the terminal voltage differences among the electricity storage elements can be solved in a short time and the terminal voltages can be made uniform among all the electricity storage elements.

Further, the second step is executed when the difference between the highest and lowest terminal voltages of the electricity storage elements reaches the specified value determined in advance. A terminal voltage balance is improved by connecting more electricity storage elements in parallel but, on the other hand, the time required for charging becomes longer. To complete charging in a short time, it is effective to connect as many electricity storage elements as possible in series and a period during which they are connected in parallel is preferably short. If the electricity storage elements are not connected in parallel as long as the terminal voltage differences are small and the second step is executed when the largest voltage difference reaches a specified value, the time required for charging can be shortened while a voltage variation among the electricity storage elements is suppressed to or below the specified value.

On the other hand, the second step may be started when a current injection time into the electricity storage elements reaches a first specified time. If a degree of capacity variation of the electricity storage elements is known, a variation of a terminal voltage increasing rate associated with charging can be predicted to a certain extent. Thus, even in a mode in which an execution timing of the second step is determined only from the current injection time without depending on actual measurement values of the terminal voltage differences, a voltage balance can be improved by connecting the electricity storage elements in parallel before the terminal voltage differences become extremely large.

Similarly, a time required to solve the terminal voltage differences when the plurality of electricity storage elements are connected in parallel can also be predicted to a certain extent from the capacities of the electricity storage elements, the electrical resistance of the wiring and the like. Thus, a transition from the second step to the third step may be made when an execution continuation time of the second step reaches a predetermined second specified time. Similarly, in the constitution in which the second step can be executed again after the third step, a transition from the third step to the second step may be made when an execution continuation time of the third step reaches a predetermined third specified time.

Further, by connecting all the electricity storage elements in series in the first step, the increasing rate of the terminal voltage of each electricity storage element at the start of charging can be maximized and a time required until each electricity storage element reaches the fully charged state can be shortened. In the mode in which all the electricity storage elements are connected in series in the third step (FIG. 7), charging after the terminal voltage differences are solved can be performed in a short time and the time required until each electricity storage element reaches the fully charged state can be further shortened.

Note that the invention is not limited to the above embodiment and various changes can be made to the aforementioned one without departing from the gist of the invention. For example, in the third step (Step S108$a$) in the charging operation shown in FIG. 7, all the electricity storage elements are connected in series. However, instead of this, some electricity storage elements may be left connected in parallel. For example, the electricity storage element having a relatively fast increasing rate of the terminal voltage during charging in series connection may be left connected in parallel to another electricity storage element.

Further, in the second step (Steps S106$f$ to S106$h$) in the charging operation shown in FIG. 9, only two adjacent electricity storage elements are connected in parallel and that combination is successively shifted. Instead of this, three or more adjacent electricity storage elements may be connected in parallel and that combination may be successively shifted.

Further, in the above embodiment, the connection change of the electricity storage elements to reduce the series degree of the two-terminal circuit is made, i.e. the second step is executed when the terminal voltage differences among the electricity storage elements become equal to or larger than the specified value. Instead of this, the second step may be started when the terminal voltage of the electricity storage element having a fastest increasing rate of the terminal voltage and having a largest terminal voltage out of the respective electricity storage elements reaches a specified value. In this case, as the specified value becomes larger, a state where the series degree is high is maintained longer and the charging speed becomes faster. If the specified value is set to be lower than a voltage at which the electricity storage elements are excessively charged, excessive charging can be reliably prevented also for the electricity storage elements having fast terminal voltage increasing rates.

Further, the connection of the electricity storage elements may be changed, for example, when a time during which the current is injected into the two-terminal circuit reaches a specified time (first specified time). As described above, if a variation of a characteristic such as an electricity storage capacity of each electricity storage element is known in advance, a variation of the terminal voltage increasing rate associated with constant current charging can be predicted to a certain extent. Thus, a timing at which the voltage variation among the electricity storage elements reaches the specified value can also be predicted to a certain extent. If the connection change to reduce the series degree of the two-terminal circuit is made before this timing, the voltage variation among the electricity storage elements does not exceed the specified value. The same holds also for the third step.

From these, all of the first, second and third steps can be controlled, for example, only based on the execution times without depending on the terminal voltage detection result of the electricity storage elements by the potential detector 40. Specifically, the connection of the electricity storage elements is changed to transition to the second step after each electricity storage element is charged for the predetermined first specified time in the first step. After the second step is executed for the second specified time, the connection of the electricity storage elements is changed if necessary to transition to the third step. The execution time of the third step is the predetermined third specified time. As just described, each of the first to third steps may be executed only for the set execution time. In this case, since it is sufficient to detect only the voltages at the both ends of the two-terminal circuit configured by the plurality of electricity storage elements, the detection of the terminal voltage of each electricity storage element can be simply omitted. Further, the first to third specified times can be determined in view of characteristics of the electricity storage elements, the magnitude of the current to be injected, electrical resistances of the wiring and the switches, a targeted charging time and the like.

Further, under the assumption that a large voltage variation does not occur among the electricity storage elements by temporarily making the connection change of the two-terminal circuit associated with a reduction of the series degree S in the process of charging the two-terminal circuit formed by connecting the electricity storage elements, a charging end timing can also be simply judged as follows. Firstly, charging can be ended when the voltages at the both ends of the electricity storage 10, i.e. the voltages at both ends of the two-terminal circuit configured by the mutual connection of the electricity storage elements $C_1$ to $C_N$ reaches a value set in advance. Secondly, charging can be ended when a total amount of electric charges injected into the electricity storage 10 reaches a value set in advance. Thirdly, charging can be ended when a total of the current injection times into the electricity storage 10 reaches a value set in advance. Note that since a product of the injected current amount and the injection time corresponds to a total electric charge amount, the second case and the third case are substantially equivalent when the current injection into the electricity storage 10 is performed with the constant current.

A judgment method based on the voltages at the both ends of the electricity storage or the current injection time can be put to practical use without any problem such as when the electricity storage is composed of a single electricity storage element, when the characteristics of all the electricity storage elements in the electricity storage perfectly or substantially match and when it is not necessary to bring each electricity storage element to the fully charged state. However, the electricity storage 10 includes the plurality of electricity storage elements and the characteristics of the individual electricity storage elements vary. Thus, to adopt a simple judgment method as described above on which the charged states of the individual electricity storage elements are not reflected, it is necessary to deal with problems due to characteristic variations. Further, in terms of the utility efficiency of the device, all the electricity storage elements are desirably approximated to the fully charged state.

Since voltages are balanced among the electricity storage elements by temporarily reducing the series degree S of the two-terminal circuit during the charging operation in the charging operation of the above embodiment, problems due to a capacity variation do not occur. Thus, the electricity storage 10 is substantially equivalent to one electricity storage element having a total capacity of the respective electricity storage elements when viewed from outside. Therefore, in the judgment of the charging end timing, it is practically possible to adopt a relatively simple method as described above without depending on the individual terminal voltages of the electricity storage elements.

Further, in the above embodiment, all the electricity storage elements are connected in parallel and constant voltage charging (trickle charging) is performed after the terminal voltages of all the electricity storage elements become equal to or higher than the specified voltage. However, this is an operation necessary to bring the terminal voltage of each electricity storage element to a target voltage without detecting the terminal potentials with high accuracy and executing a control based on that and maintain a state where each electricity storage element is fully charged after such a state is reached. Constant voltage charging is not an essential requirement for the purpose of fully charging each electricity storage element while balancing voltages among the electricity storage elements in a short time.

Further, the configuration of the connection switcher 30 of the above embodiment is a configuration minimum necessary to configure a two-terminal circuit matching the gist of the invention by electrically connecting a plurality of electricity storage elements and the configuration of the "connector" of the invention is not limited to this. Various circuit configurations other than the two-terminal circuits illustrated above may also be realizable.

Further, in the electricity storage device 1 of the above embodiment, one electricity storage 10 is connected to the power feeder 20. However, instead of this, a plurality of electricity storages may be provided for one power feeder. In this case, it is sufficient to configure a two-terminal circuit matching each of the above conditions in each electricity storage.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

REFERENCE SIGNS LIST 1 electricity storage device
10 electricity storage
20 power feeder
21 current source (current injector)
22 voltage source (voltage applier)
23, 24 switch
30 connection switcher (connector)
40 potential detector
50 controller
$C_1$ to $C_N$ electricity storage element
S102 to SS103, S102a to S103 first step
S106, S106a to S106b, S106c to S106e, S106f to S106h second step
S108, S108a third step
S112 to S113 fourth step
$SW_{11}$ to $SW_{N3}$ switch
$U_1$ to $U_s$ unit circuit

The invention claimed is:
1. A charging method for charging N (N is equal to or larger than 3) electricity storage elements by connecting the electricity storage elements electrically using a connector,
wherein a two-terminal circuit and a series degree of the two-terminal circuit are defined as follows:
the two-terminal circuit has a circuit configuration in which a plurality of unit circuits are connected in series or a circuit configuration in which all the electricity storage elements are connected in parallel, each of the unit circuits being composed of a single electricity storage element or a plurality of the electricity storage elements connected in parallel, and
the series degree is a number of unit circuits connected in series if the two-terminal circuit has the circuit configuration in which the plurality of unit circuits are connected in series; or
the series degree is 1 if all the electricity storage elements are connected in parallel in the two-terminal circuit, and wherein the connector includes a single switch which is disposed between one terminal of an n-th electricity storage element (n=1, 2, . . . , N−1) and one terminal of an (n+1)-th electricity storage element, a single switch which is disposed between another terminal of the n-th electricity storage element and another terminal of the (n+1)-th electricity storage element, and a single switch which is disposed between the another terminal of the n-th electricity storage element (n=1, 2, . . . , N−1) and the one terminal of the (n+1)-th electricity storage element; and all the electricity storage elements are connected electrically to constitute the two-terminal circuit having the series degree S (S=1, 2, . . . , N), the charging method comprising:

a first step in which the electricity storage elements are connected by the connector to configure the two-terminal circuit having a value of the series degree of 2 or larger and each of the electricity storage elements are charged by injecting a current into the two-terminal circuit configured by the connector;

a second step in which a new two-terminal circuit is configured by changing a connection of the electricity storage elements to reduce the value of the series degree; and a third step in which a new two-terminal circuit is configured by changing the connection of the electricity storage elements to increase the value of the series degree and charging each of the electricity storage elements by injecting a current into the two-terminal circuit, wherein:

the second step is started when a terminal voltage difference among the electricity storage elements becomes equal to or larger than a predetermined value;

in the second step, at least one of the electricity storage element having a highest terminal voltage and the electricity storage element having a lowest terminal voltage out of the plurality of the storage elements are connected to another electricity storage element in parallel;

in the third step, no electricity storage element having a terminal voltage below a specified voltage is connected in parallel to another electricity storage element;

the third step is started when there is any electricity storage element whose terminal voltage is not reached the specified voltage after the second step, and the value of the series degree of the two-terminal circuit at the second step is larger than 1 and the value of the series degree of the two-terminal circuit at the third step is smaller than N.

2. The charging method according to claim 1, wherein the second step is executed when the terminal voltage difference among the electricity storage elements becomes equal to or larger than the predetermined value in the third step and, in the second step after the third step, the two-terminal circuit in which the value of the series degree is smaller than the value of the series degree of the two-terminal circuit in the third step executed directly before the second step is configured.

3. The charging method according to claim 2, wherein in at least one of the second step, a combination of the electricity storage elements to be connected in parallel in the two-terminal circuit is different from the combination in the second step previously executed.

4. The charging method according to claim 1, wherein in the second step, the circuit configuration of the two-terminal circuit is changed, thereby plural types of the two-terminal circuits in which the circuit configurations are different each other are configured one after another.

5. The charging method according to claim 4, wherein in the second step, the plural types of the two-terminal circuits in which the values of the series degree are same and the circuit configurations are different each other are configured.

6. The charging method according to claim 1, further comprising a fourth step in which all the electricity storage elements are connected in parallel and each electricity storage element is charged by constant voltage only after the second step and the third step.

7. The charging method according to claim 6, wherein the fourth step is performed when the terminal voltages of all the electricity storage elements become equal to or higher than a specified voltage.

8. The charging method according to claim 1, wherein the second step is executed without the current being injected into the electricity storage elements.

9. The charging method according to claim 1, wherein all the electricity storage elements are connected in series in the first step.

10. The charging method according to claim 1, wherein the electricity storage elements are electrochemical capacitors or secondary batteries.

* * * * *